(12) United States Patent
Hagiwara et al.

(10) Patent No.: US 12,068,458 B2
(45) Date of Patent: Aug. 20, 2024

(54) BATTERY GROUP, BATTERY, AND BATTERY PACK

(71) Applicant: KABUSHIKI KAISHA TOSHIBA, Tokyo (JP)

(72) Inventors: Asuna Hagiwara, Kashiwazaki (JP); Masanori Tanaka, Kashiwazaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 554 days.

(21) Appl. No.: 17/400,576

(22) Filed: Aug. 12, 2021

(65) Prior Publication Data

US 2021/0376393 A1    Dec. 2, 2021

Related U.S. Application Data

(63) Continuation of application No. PCT/JP2019/012453, filed on Mar. 25, 2019.

(51) Int. Cl.
*H01M 10/0587*    (2010.01)
*H01M 4/485*    (2010.01)
(Continued)

(52) U.S. Cl.
CPC ....... *H01M 10/0587* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS 9,647,261 B2    5/2017    Ohara et al.
2014/0335417 A1*    11/2014    Nagai .................. H01M 4/505
429/231.1
(Continued)

FOREIGN PATENT DOCUMENTS

JP    2011-81931 A    4/2011
JP    2013-243097 A    12/2013
(Continued)

OTHER PUBLICATIONS

International Search Report issued May 21, 2019 in PCT/JP2019/012453, filed on Mar. 25, 2019, 1 page.
(Continued)

*Primary Examiner* — Gregg Cantelmo
(74) *Attorney, Agent, or Firm* — Maier & Maier, PLLC

(57) ABSTRACT

According to one embodiment, provided is an electrode group including a stack that includes a positive electrode and a negative electrode. A first width of the positive electrode active material-containing layer of the positive electrode in a first direction is smaller than a second width of the negative electrode active material-containing layer of the negative electrode in the first direction. The electrode group has a wound structure where the stack is wound along the first direction. A length L corresponding to a difference between the second and first widths, a mass per unit area $M_a$ of the negative electrode active material-containing layer, and a ratio p/n of a capacity p of the positive electrode to a capacity n of the negative electrode satisfy a relationship of 40 mg/m $\leq (L \times M_a)/(p/n) \leq$ 60 mg/m.

7 Claims, 9 Drawing Sheets

(51) Int. Cl.
  *H01M 4/505*     (2010.01)
  *H01M 4/525*     (2010.01)
  *H01M 10/04*     (2006.01)
  *H01M 10/0525*   (2010.01)
  *H01M 10/0564*   (2010.01)
  *H01M 10/0567*   (2010.01)

(52) U.S. Cl.
  CPC ....... *H01M 4/525* (2013.01); *H01M 10/0431* (2013.01); *H01M 10/0564* (2013.01); *H01M 10/0567* (2013.01); *H01M 10/0525* (2013.01)

(56) References Cited

U.S. PATENT DOCUMENTS

2015/0064529 A1* 3/2015 Nagai ............... H01M 10/0587
                                                  429/94
2015/0280209 A1   10/2015 Ohara et al.

FOREIGN PATENT DOCUMENTS

| JP | 2015-56241 A    | 3/2015 |
| JP | WO2014/073113 A1 | 9/2016 |
| JP | 2018-56438 A    | 4/2018 |
| JP | 2018-97928 A    | 6/2018 |

OTHER PUBLICATIONS

Extended European Search Report issued Feb. 18, 2022 in European Patent Application No. 19921416.4, 8 pages.

\* cited by examiner

BATTERY GROUP, BATTERY, AND BATTERY PACK

CROSS-REFERENCE TO RELATED APPLICATIONS

This application is a Continuation Application of PCT Application No. PCT/JP2019/012453, filed Mar. 25, 2019, the entire contents of which are incorporated herein by reference.

FIELD

Embodiments generally relate to a battery group, a battery, and a battery pack.

BACKGROUND

Including lithium ion secondary batteries, secondary batteries such as nonaqueous electrolyte batteries are widely used for portable devices, automobiles, electrical storage batteries, and such. While lithium ion secondary batteries and the like are electrical storage devices whose market size is expected to expand, one issue is capacity degradation when charge-discharge cycles are repeated. Various causes can be pointed out as causes of capacity degradation, such as active material degradation, gas generation, and shift of operation range.

Shift of operation range, which is one of the above-mentioned causes, is a phenomenon where the use range becomes mismatched between the positive electrode and the negative electrode as charge-discharge cycles are repeated. If this phenomenon can be suppressed, suppression of the capacity of secondary batteries is expected to become possible. For the shift of operation range, the occurrence of difference in state of charge between the positive electrode and the negative electrode due to self-discharge of the negative electrode is considered as one cause.

DETAILED DESCRIPTION

Figure 1:
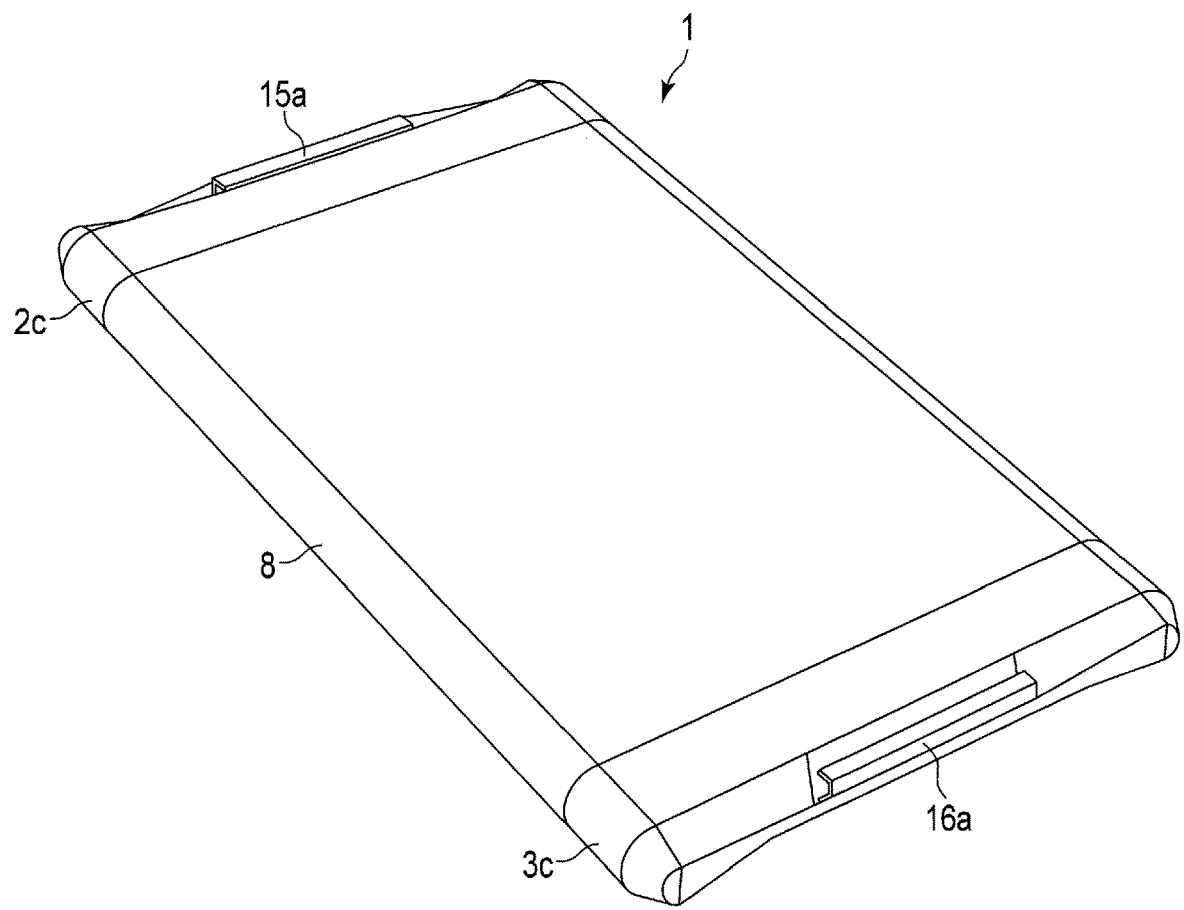
FIG. 1 is a perspective view schematically showing an example of an electrode group according to an embodiment.

According to one embodiment, provided is an electrode group including a stack that includes a positive electrode and a negative electrode. The positive electrode includes a positive electrode current collector and a positive electrode active material-containing layer on the positive electrode current collector. The negative electrode includes a negative electrode current collector and a negative electrode active material-containing layer on the negative electrode current collector. A first width of the positive electrode active material-containing layer in a first direction is smaller than a second width of the negative electrode active material-containing layer in the first direction. The electrode group has a wound structure where the stack is wound in such a manner that a center of the wound structure is positioned along the first direction. A length L represented in units of mm and corresponding to a difference between the second width and the first width, a mass per unit area $M_a$ of the negative electrode active material-containing layer represented in units of $g/m^2$ per each side of the negative electrode current collector, and a ratio p/n of a capacity p of the positive electrode to a capacity n of the negative electrode satisfy a relationship of $40 \text{ mg/m} \leq (L \times M_a)/(p/n) \leq 60 \text{ mg/m}$.

According to another embodiment, provided is a battery including the electrode group according to the above embodiment.

According to yet another embodiment, provided is a battery pack including the battery according to the above embodiment.

Embodiments will be explained below with reference to the drawings. Structures common to all embodiments are represented by the same symbols and overlapping explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, an electrode group including a stack is provided. The stack includes a positive electrode and a negative electrode. The positive electrode includes a positive electrode current collector and a positive electrode active material-containing layer on the positive electrode current collector. The negative electrode includes a negative electrode current collector and a negative electrode active material-containing layer on the negative electrode current collector. A first width of the positive electrode active material-containing layer in a first direction is smaller than a second width of the negative electrode active material-containing layer in the first direction.

The electrode group has a wound structure. The wound structure is configured with the stack being wound so that a center of the wound structure is positioned along the first direction. A length L corresponding to a difference between the second width and the first width, a mass per unit area $M_a$ of the negative electrode active material-containing layer per each side of the negative electrode current collector, and a ratio p/n of a capacity p of the positive electrode to a capacity n of the negative electrode satisfy a relationship of 40 mg/m≤(L×$M_a$)/(p/n)≤60 mg/m.

In a battery adopting the electrode group having the above-described configuration, a decrease in capacity during repetition of a charge-discharge cycle is suppressed. Therefore, the battery adopting the above electrode group has an excellent capacity retention ratio.

The positive electrode includes a positive electrode current collector and a positive electrode active material-containing layer formed on the positive electrode current collector.

The positive electrode current collector may include a portion that does not support the positive electrode active material-containing layer on the surface. This portion can serve as a positive electrode current collecting tab. Alternatively, the positive electrode may further include a positive electrode current collecting tab provided separately from the positive electrode current collector.

The positive electrode active material-containing layer contains a positive electrode active material. The positive electrode active material-containing layer may further contain an electro-conductive agent and a binder, as needed.

The negative electrode includes a negative electrode current collector and a negative electrode active material-containing layer formed on the negative electrode current collector.

The negative electrode current collector may include a portion that does not support the negative electrode active material-containing layer on the surface. This portion can serve as a negative electrode current collecting tab. Alternatively, the negative electrode may further include a negative electrode current collecting tab provided separately from the negative electrode current collector.

The negative electrode active material-containing layer contains a negative electrode active material. Further, the negative electrode active material-containing layer may further contain an electro-conductive agent and a binder, as needed.

The electrode group according to the embodiment may further include a separator. The separator may configure the electrode group together with the positive electrode and the negative electrode. For example, in the electrode group, the positive electrode active material-containing layer and the negative electrode active material-containing layer may face each other with the separator interposed therebetween. The electrode group has a wound structure.

The electrode group according to the embodiment will be described with reference to FIGS. 1 to 3.

FIG. 1 is a schematic perspective view of an example of the electrode group according to the embodiment. FIG. 2 is a schematic perspective view of a partially unwound state of the electrode group. FIG. 3 is a cross-sectional view of the electrode group taken along line in FIG. 2.

Figure 2:
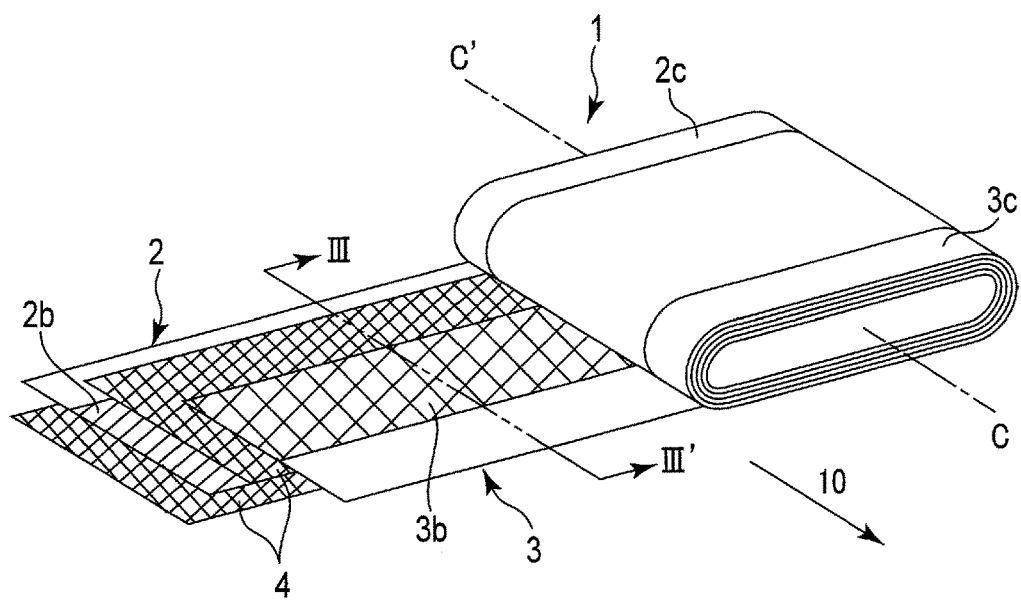
FIG. 2 is a perspective view schematically showing a partially unwound state of the electrode group.
Figure 3:
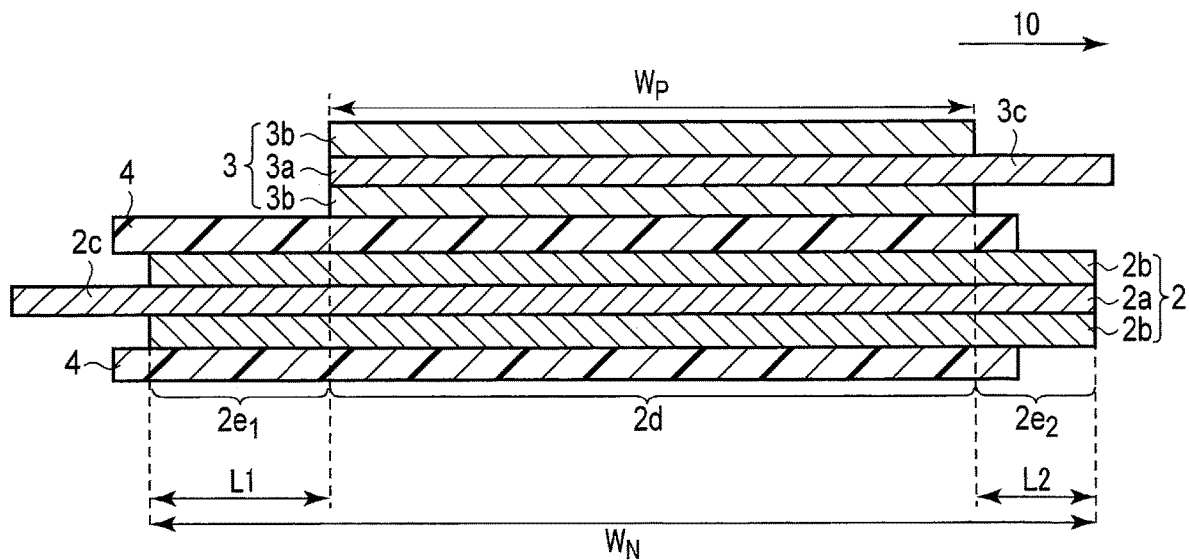
FIG. 3 is a cross-sectional view of the electrode group taken along line in FIG. 2.

An electrode group 1 shown in FIGS. 1 to 3 includes a positive electrode 3, a negative electrode 2, and a separator 4. As shown in FIG. 2, the electrode group 1 has a structure in which a stack including the positive electrode 3, the negative electrode 2, and the separator 4 disposed between the positive electrode 3 and the negative electrode 2 is wound into a flat shape. This wound structure is formed by winding the stack centered around an imaginary line C-C' parallel to a first direction 10 intersecting with a first edge along the long side of the positive electrode 3.

As shown in FIG. 3, the positive electrode 3 includes a positive electrode current collector 3a, a positive electrode active material-containing layer 3b, and a positive electrode current collecting tab 3c. The positive electrode current collector 3a has a strip shape. The positive electrode active material-containing layer 3b is supported on the positive electrode current collector 3a. The positive electrode current collecting tab 3c is provided on one side of the positive electrode current collector 3a, for example, at an end parallel to the long side of the strip shape.

The positive electrode current collecting tab 3c may be part of the positive electrode current collector 3a. For example, the portion of the positive electrode current collector 3a that does not support the positive electrode active material-containing layer 3b may be used as the positive electrode current collecting tab 3c. In other words, the positive electrode current collecting tab 3c may protrude from an end of the positive electrode active material-containing layer 3b.

On the other hand, the negative electrode 2 includes a negative electrode current collector 2a and a negative electrode active material-containing layer 2b. The negative electrode current collector 2a has a strip shape. The negative electrode active material-containing layer 2b is supported on the negative electrode current collector 2a. A negative electrode current collecting tab 2c is provided on one side of the negative electrode current collector 2a, for example, at an end parallel to the long side of the strip shape.

The negative electrode current collecting tab 2c may be part of the negative electrode current collector 2a. For example, the portion of the negative electrode current collector 2a that does not support the negative electrode active material-containing layer 2b may be used as the negative electrode current collecting tab 2c. In other words, the negative electrode current collecting tab 2c may protrude from an end of the negative electrode active material-containing layer 2b.

As shown in FIG. 1, when implementing the electrode group 1 in a battery, a positive electrode lead 16a and a negative electrode lead 15a may be connected to the electrode group 1, or an insulating sheet 8 may be provided to the electrode group 1. The positive electrode lead 16a is electrically connected to the positive electrode current collecting tab 3c. The negative electrode lead 15a is electrically connected to the negative electrode current collecting tab 2c. The insulating sheet 8 covers, for example, a portion of the outermost periphery of the electrode group 1 excluding the positive electrode current collecting tab 3c and the negative electrode current collecting tab 2c.

In the electrode group 1, the positive electrode active material-containing layer 3b of the positive electrode 3 and the negative electrode active material-containing layer 2b of the negative electrode 2 face each other with the separator 4 interposed therebetween. The positive electrode current collecting tab 3c protrudes further than the negative electrode active material-containing layer 2b and the separator 4 toward one side along the imaginary line C-C' corresponding to the winding axis of the stack. The negative electrode current collecting tab 2c protrudes further toward the opposite side than the positive electrode active material-containing layer 3b and the separator 4. Therefore, in the electrode group 1, the positive electrode current collecting tab 3c wound in a flat spiral shape is positioned at a first end surface intersecting with the imaginary line C-C'. The negative electrode current collecting tab 2c wound in a flat spiral shape is positioned at a second end surface intersecting with the imaginary line C-C' on the opposite side of the electrode group 1. The first end surface and the second end surface may be parallel to the first edge of the positive electrode 3. In this manner, in the electrode group 1 shown as an example in FIGS. 1 to 3, the positive electrode current collecting tab 3c is positioned on the opposite side of the wound stack from the negative electrode current collecting tab 2c. The positive electrode current collecting tab 3c and the negative electrode current collecting tab 2c may be arranged at the same end surface of the wound stack.

As shown in FIG. 3, a first width $W_P$ of the positive electrode active material-containing layer 3b is smaller than a second width $W_N$ of the negative electrode active material-containing layer 2b. The first width $W_P$ is a width that the positive electrode active material-containing layer 3b spans in the first direction 10 (lateral direction in FIG. 3) parallel to the winding axis of the stack (imaginary line C-C' in FIG. 2). Likewise, the second width $W_N$ is a width that the negative electrode active material-containing layer 2b spans in the first direction 10.

The first width $W_P$ of the positive electrode active material-containing layer 3b is narrower than the second width $W_N$ of the negative electrode active material-containing layer 2b. Therefore, the entire region of the positive electrode active material-containing layer 3b along the first direction overlaps the negative electrode active material-containing layer 2b. The second width $W_N$ of the negative electrode active material-containing layer 2b is wider than the first width $W_P$ of the positive electrode active material-containing layer 3b. Therefore, a part of the negative electrode active material-containing layer 2b protrudes further outward in the width direction than the end of the positive electrode active material-containing layer 3b. In other words, a part of regions of the negative electrode active material-containing layer 2b along the first direction overlaps the positive electrode active material-containing layer 3b, and the other region does not overlap the positive electrode active material-containing layer 3b. Regions of the negative electrode active material-containing layer 2b that do not overlap the positive electrode active material-containing layer 3b may be arranged at both ends in the width direction with the region overlapping the positive electrode active material-containing layer 3b interposed therebetween. The negative electrode active material-containing layer 2b protrudes further outward in both directions parallel to the winding axis of the electrode group 1 (both directions along the first direction 10) than the positive electrode active material-containing layer 3b.

The positive electrode active material-containing layer 3b faces the negative electrode active material-containing layer 2b over the entire first width $W_P$ with the separator 4 interposed therebetween. On the other hand, the negative electrode active material-containing layer 2b includes a section facing the positive electrode active material-containing layer 3b with the separator 4 interposed therebetween and a section not facing the positive electrode active material-containing layer 3b.

The negative electrode active material-containing layer 2b includes a facing section 2d corresponding to the section facing the positive electrode active material-containing layer 3b in the middle along the first direction 10. That is, the facing section 2d is a section of the negative electrode active material-containing layer 2b that overlaps the positive electrode active material-containing layer 3b in the planar direction.

The negative electrode active material-containing layer 2b includes a first non-facing section $2e_1$ corresponding to the section not facing the positive electrode active material-containing layer 3b at one end of the second width $W_N$, and a second non-facing section $2e_2$ corresponding to the section not facing the positive electrode active material-containing layer 3b at the other end of the second width $W_N$. The first non-facing section $2e_1$ and the second non-facing section $2e_2$ correspond to the sections of the negative electrode active material-containing layer 2b that protrude further outward in the width direction than the ends of the positive electrode active material-containing layer 3b. That is, the non-facing sections are regions of the negative electrode active material-containing layer 2b that do not overlap the positive electrode active material-containing layer 3b in the planar direction.

It is desirable that both a length L1 of the first non-facing section $2e_1$ in the first direction 10 and a length L2 of the second non-facing section $2e_2$ in the first direction 10 exceed zero. That is, the negative electrode active material-containing layer 2b desirably extends further outward than the positive electrode active material-containing layer 3b on both sides in the width direction, as shown in FIG. 3. The sum of the protruding length L1 of the first non-facing section $2e_1$ and the protruding length L2 of the second non-facing section $2e_2$ is equal to the difference between the second width $W_N$ of the negative electrode active material-containing layer 2b and the first width $W_P$ of the positive electrode active material-containing layer 3b.

The electrode group according to the embodiment satisfies the relationship represented by the following formula (1):

$$40 \text{ mg/m} \leq (L \times M_a)/(p/n) \leq 60 \text{ mg/m} \tag{1}$$

In the above formula, the symbols L, $M_a$ and p/n represent the following.

The symbol L represents a difference between the second width $W_N$ of the negative electrode active material-containing layer 2b and the first width $W_P$ of the positive electrode active material-containing layer 3b ($L=W_N-W_P$). That is, the length L is the sum of the length L1 of the first non-facing section of the negative electrode active material-containing layer in the width direction and the length L2 of the second non-facing section of the negative electrode active material-containing layer in the width direction (L=L1+L2), which are arranged at the ends in both directions along the first direction in the electrode group. The length L is represented in numerical units of mm (millimeters), for example. The length L may be, for example, 0.5 mm or more, and preferably 1 mm or more. When the length L is sufficiently long, the positive electrode active material-containing layer more reliably faces the negative electrode active material-containing layer over the entire width of the first width $W_P$, whereby the capacity can be secured. The length L may be, for example, 3 mm or less, and preferably 2.5 mm or less. The non-facing sections of the negative electrode hardly contribute to charge and discharge. By keeping the length L of the non-facing sections of the negative electrode from being excessively long, the energy density can be secured.

The symbol $M_a$ represents the mass per unit area of the negative electrode active material-containing layer. The mass per unit area $M_a$ of the negative electrode active material-containing layer refers to the mass per unit area of the negative electrode active material-containing layer supported on the negative electrode current collector for each of the principal faces of the negative electrode current collector. The negative electrode active material-containing layer may be provided only on one of the principal faces of the negative electrode current collector. Alternatively, the negative electrode active material-containing layer may be provided on both of the principal faces on the front and back of the negative electrode current collector. When the negative electrode active material-containing layer is formed on both sides of the negative electrode current collector, an average value of the mass per unit area of the negative electrode active material-containing layer supported on one side of the negative electrode current collector and the mass per unit area of the negative electrode active material-containing layer supported on the other side of the negative electrode current collector is equal to the mass per unit area $M_a$ of the negative electrode active material-containing layer. In the portion where the negative electrode active material-containing layer is formed on both sides of the negative electrode current collector, the mass per unit area of the negative electrode active material-containing layer on one side may be equal to the mass per unit area of the negative electrode active material-containing layer on the reverse side. The mass per unit area $M_a$ of the negative electrode active material-containing layer includes both the mass per unit area of the section facing the positive electrode active material-containing layer and the mass per unit area of the sections not facing the positive electrode active material-containing layer (both the first non-facing section and the second non-facing section). The mass per unit area $M_a$ of the negative electrode active material-containing layer is represented in numerical units of $g/m^2$ (gram/square meter), for example. The mass per unit area $M_a$ of the negative electrode active material-containing layer may be, for example, 30 $g/m^2$ or more. The mass per unit area $M_a$ of the negative electrode active material-containing layer may be, for example, 100 $g/m^2$ or less.

The numerator $(L \times M_a)$ in the above formula (1) represents the amount of the sections of the negative electrode active material-containing layer existing as the non-facing sections (i.e., a combination of the first non-facing section and the second non-facing section).

The symbol p/n represents the positive-negative electrode capacity ratio for the electrode group. Specifically, the ratio p/n is a ratio of the capacity p of the positive electrode to the capacity n of the negative electrode (p/n=[positive electrode capacity p]/[negative electrode capacity n]). The positive electrode capacity p and the negative electrode capacity n are represented in numerical units of mAh (milli-ampere hour), for example. The ratio p/n may be, for example, greater than 1, and is preferably equal to or greater than 1.1. The ratio p/n may be, for example, 1.8 or less, and is preferably 1.6 or less. A method for measuring the positive electrode capacity p and the negative electrode capacity n will be described later.

When the value of $(L \times M_a)/(p/n)$ is from 40 mg/m to 60 mg/m, the following effects can be obtained.

Various phenomena can be cited as factors of self-discharge of the negative electrode. Among them, included is a phenomenon in which lithium ions drift to sections of the negative electrode not facing the positive electrode. Whereas lithium ions in a portion of the negative electrode facing the positive electrode contribute to subsequent charge and discharge, lithium ions in the sections of the negative electrode not facing the positive electrode hardly contribute to subsequent charge and discharge. As such, if lithium ions drift to the sections not facing the positive electrode, the capacity of the negative electrode is substantially reduced, that is, a state similar to partial discharge occurs. As a result, a discrepancy may occur between the state of charges of the negative electrode and the positive electrode.

Lithium ions charged into the negative electrode during early charge of the battery adopting the electrode group diffuse to the non-facing sections (the first non-facing section and the second non-facing section) of the negative electrode active material-containing layer. When the formula (1) is satisfied, the diffused lithium ions are immobilized in the non-facing sections of the negative electrode active material-containing layer. In such a state, further drifting of the lithium ions to the non-facing sections is suppressed during charges that follow. Accordingly, self-discharge of the negative electrode can be reduced, allowing for a decrease in the shift of operation range caused by repetition of charge and discharge. Thereby, a decrease in capacity due to the shift of operation range can be suppressed.

If $(L \times M_a)/(p/n)$ exceeds 60 mg/m, $(L \times M_a)$ is too large or the ratio p/n is too small. In either case, it means that the size of the non-facing sections of the negative electrode active material-containing layer are relatively too large. In this case, lithium ions are less likely to diffuse into the entire non-facing sections. Then, a portion in which lithium ions are not immobilized remains in a part of the non-facing sections. As a result, the shift of operation range occurring when a charge-discharge cycle is repeated cannot be suppressed, leading to a decrease in capacity.

If $(L \times M_a)/(p/n)$ is less than 40 mg/m, $(L \times M_a)$ is too small or the ratio p/n is too large. Small $(L \times M_a)$ means that the non-facing sections of the negative electrode active material-containing layer are relatively small with respect to the facing section. In this case, even if lithium ions diffuse into the non-facing sections, the lithium ions are less likely to be immobilized therein. This is because the non-facing sections also behave similarly to the facing section during charges that follow, and which can be expressed as a state where the boundary between the facing section and the non-facing sections is vague. When the ratio p/n is too large, the mass per unit area of the negative electrode active material-containing layer with respect to the positive electrode capacity p is small, and lithium easily moves from the negative electrode to the positive electrode, facilitating progression of self-discharge. Because of this, immobilization of lithium ions in the non-facing sections of the negative electrode active material-containing layer is difficult. As a result of the difficulty in immobilizing the lithium ions in the non-facing sections, the shift of operation range occurring when a charge-discharge cycle is repeated cannot be suppressed, leading to a decrease in capacity.

The immobilization of lithium ions in the non-facing sections of the negative electrode will be described with reference to FIGS. 4 and 5.

Figure 4:
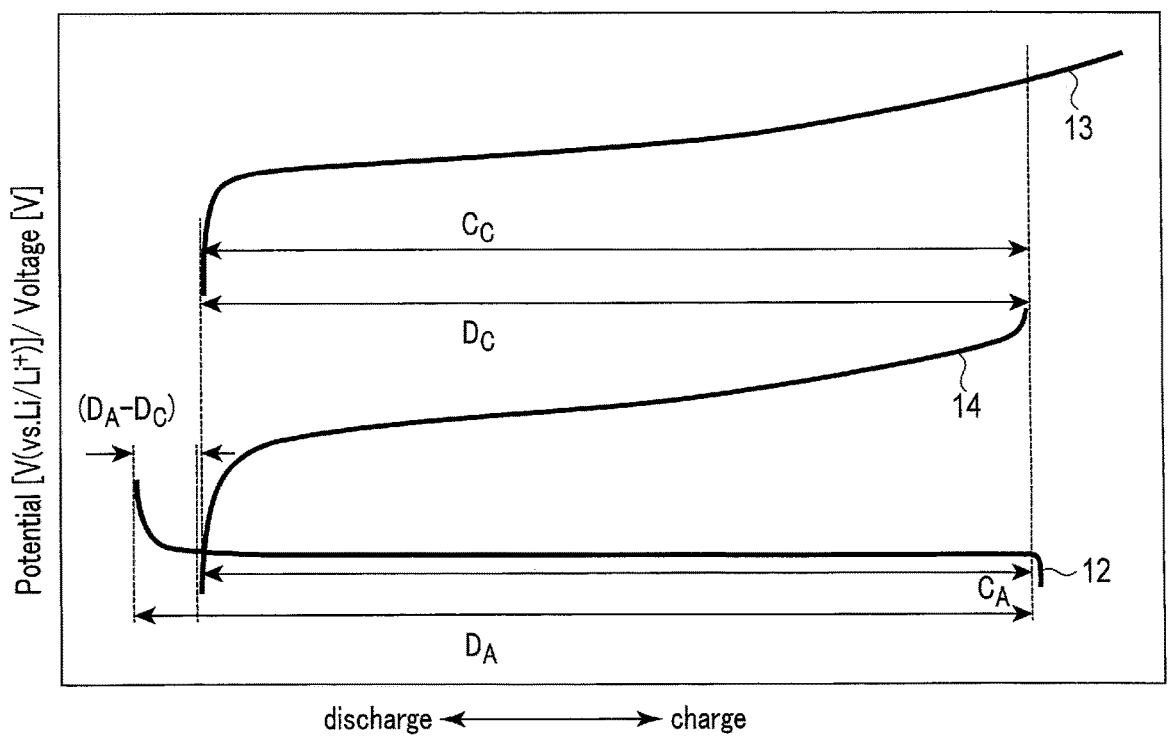
FIG. 4 is a graph schematically illustrating potential curves during initial charge-discharge, of an example of a battery which adopts the electrode group according to the embodiment.

FIG. 4 is a graph schematically illustrating potential curves during initial charge-discharge, of an example of the battery which adopts the electrode group according to the embodiment. FIG. 5 is a graph illustrating potential curves in a shipment state, of the example of the battery adopting the electrode group according to the embodiment.

Figure 5:
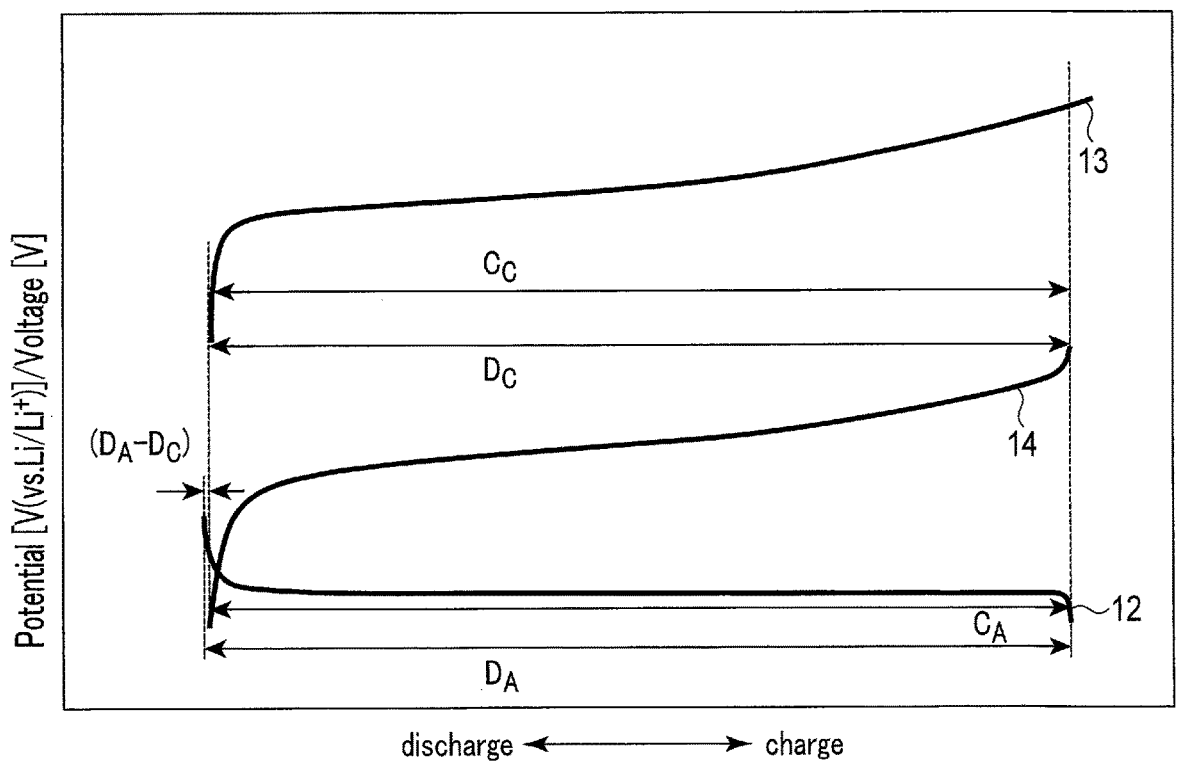
FIG. 5 is a graph schematically illustrating potential curves in a shipment state, of the example of the battery adopting the electrode group according to the embodiment.

In the graphs shown in FIGS. 4 and 5, the horizontal axis represents the capacities of the positive electrode and negative electrode of the battery. The capacity $C_C$ represents the charge capacity of the positive electrode, and the capacity $D_C$ represents the discharge capacity of the positive electrode. The capacity $C_A$ represents the charge capacity of the negative electrode, and the capacity $D_A$ represents the discharge capacity of the negative electrode.

The curve 13 is obtained by, for example, measuring the discharge capacity $D_C$ of the positive electrode and plotting the positive electrode potential relative to the oxidation-reduction potential of lithium (unit: V (vs. Li/Li$^+$)) against the capacity. The curve 12 is obtained by, for example, measuring the discharge capacity $D_A$ of the negative electrode and plotting the negative electrode potential relative to the oxidation-reduction potential of lithium (unit: V (vs. Li/Li$^+$)) against the capacity. The curve 14 schematically shows a battery voltage (unit: V) as a function of the capacity of this battery as an example.

In the battery including the electrode group according to the embodiment, the positional relationship between the curve 13 and the curve 12 during the initial charge-discharge is of an arrangement shown in FIG. 4 due to the difference in the charge-discharge efficiency between the positive and the negative electrodes upon the initial charge-discharge. That is, the position of the positive electrode potential curve (curve 13) in the lateral direction is inclined toward the charge side (right side in FIG. 4) as compared with the negative electrode potential curve (curve 12). Therefore, there is a portion of the negative electrode potential curve (curve 12) that does not overlap the positive electrode potential curve (curve 13) on the discharge side (left side in FIG. 4). The discharge capacity $D_C$ of the positive electrode is smaller than the discharge capacity $D_A$ of the negative electrode. The width of the portion of the negative electrode potential curve (curve 12) that does not overlap the positive electrode potential curve (curve 13) corresponds to the difference ($D_A$–$D_C$) between the discharge capacity $D_C$ of the positive electrode and the discharge capacity $D_A$ of the negative electrode.

In the initial charge, lithium ions first move from the positive electrode to the facing section of the negative electrode. Then, part of the lithium ions diffuse from the facing section to the non-facing sections of the negative electrode. The lithium ions diffused to the non-facing sections are immobilized therein. Thereby, the discharge capacity $D_A$ of the negative electrode decreases. On the other hand, a change in the discharge capacity $D_C$ of the positive electrode is little. As a result, the difference ($D_A$–$D_C$) between the discharge capacity $D_C$ of the positive electrode and the discharge capacity $D_A$ of the negative electrode is reduced, as shown in FIG. 5. In this manner, in the battery including the electrode group according to the embodiment, distribution of lithium ions in the negative electrode is adjusted during initial charge, so that the state of charge of the positive electrode and the state of charge of the negative electrode become close to each other. As shown in FIG. 5, the positive electrode potential curve (curve 13) and the negative electrode potential curve (curve 12) mostly overlap each other in the lateral direction.

As in the example of the battery shown in FIG. 5, it is desirable that the state of charge of the positive electrode and the state of charge of the negative electrode match with each other in the shipment state. Since the self-discharge of the negative electrode is suppressed by the immobilization of lithium in the non-facing sections of the negative electrode, the match of state of charge between the positive electrode and the negative electrode can be maintained.

By appropriately adjusting the conditions of early charge, the balance between the state of charge of the positive electrode and the state of charge of the negative electrode can be controlled more favorably. For example, when the battery is charged to a low state of charge (SOC), the rate of a decrease in the state of charge of the negative electrode exceeds the rate of a decrease in the state of charge of the positive electrode.

The transition of the relationship between the state of charge of the positive electrode and the state of charge of the negative electrode in the early adjustment for adjusting the assembled battery to a shipment state will be described with reference to FIGS. 6 to 8.

Figure 6:
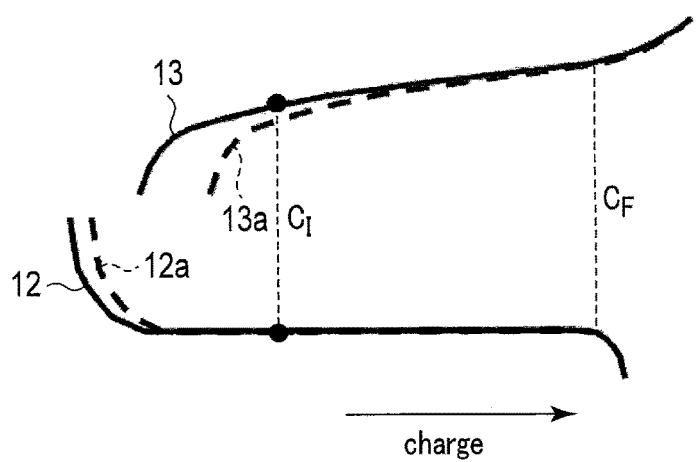
FIG. 6 is a conceptual diagram illustrating an early state of charge of the example of the battery adopting the electrode group according to the embodiment.

FIG. 6 is a conceptual diagram illustrating an early state of charge of the example of the battery adopting the electrode group according to the embodiment. FIG. 7 is a conceptual diagram illustrating early adjustment of the example of the battery adopting the electrode group according to the embodiment. FIG. 8 is a conceptual diagram illustrating follow-up charge after adjustment of the example of the battery adopting the electrode group according to the embodiment to a shipment state. In each of FIGS. 6 to 8, the curve 13 represents a positive electrode potential curve, and the curve 12 represents a negative electrode potential curve. The broken line 13a and the broken line 12a indicate a positive electrode potential curve and a negative electrode potential curve in an open circuit state.

The charge-discharge balance between the positive and negative electrodes during an early stage of charge is affected by the composition of the positive electrode active material, the mass per unit area of the positive electrode active material, the composition of the negative electrode active material, the mass per unit area of the negative electrode active material, the charge-discharge efficiency, and the like at the time of assembling the battery. For example, when a battery assembled using a lithium-containing nickel-cobalt-manganese composite oxide as the positive electrode active material and lithium titanate as the negative electrode active material is charged to a full-charge capacity $C_F$ during initial charge, a positive electrode potential curve (curve 13) and a negative electrode potential curve (curve 12) may be measured as having a positional relationship similar to that shown in FIG. 6. The initial charge capacity $C_I$ in the initial-charged state when performing the early adjustment to the shipment state may be a capacity in the state of charge (SOC) lower than the full-charge capacity $C_F$. The battery may be charged to the initial charge capacity $C_I$ in the first charge after the assembly of the battery. Alternatively, the battery may be adjusted to the initial-charged state by charging the battery to the full-charge capacity $C_F$ and then discharging the battery to the initial charge capacity $C_I$. That is, the initial-charged state as referred to herein is not necessarily limited to the first charge.

When the battery is held in the initial-charged state, the state of charge changes independently in the positive electrode and the negative electrode, respectively. Hereupon, if the state of charge (SOC) of the battery is low at the start of holding the battery in the initial-charged state, a decrease in the state of charge of the negative electrode proceeds faster than that of the positive electrode, as indicated by the sliding S in FIG. 7. For example, when the battery is adjusted to an SOC of 20% (e.g., [initial charge capacity $C_I$]/[full-charge capacity $C_F$]=20%) and then held under an atmosphere of 60° C., a phenomenon similar to that shown in FIG. 7 may occur. At this time, gas may be generated inside the battery; the gas is desirably discharged upon finishing the early adjustment.

Figure 7:
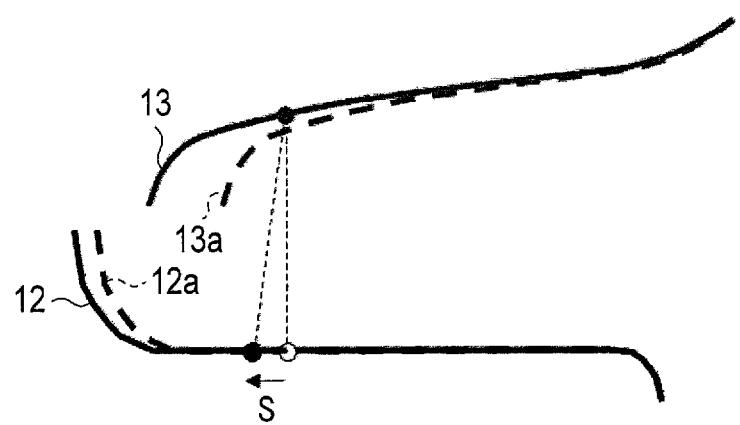
FIG. 7 is a conceptual diagram illustrating early adjustment of the example of the battery adopting the electrode group according to the embodiment.
Figure 8:
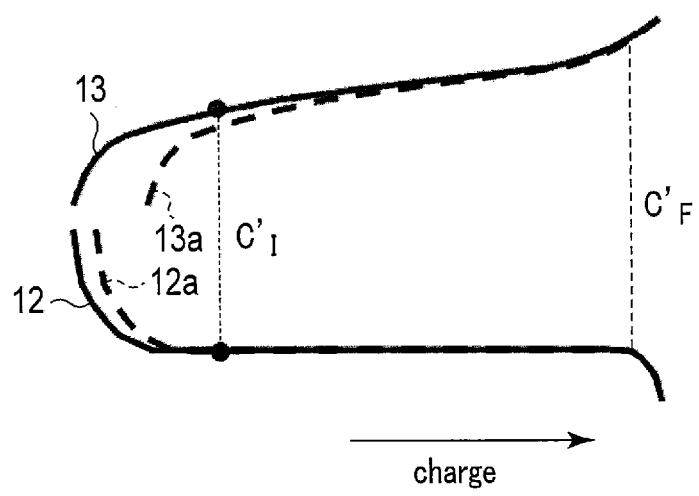
FIG. 8 is a conceptual diagram illustrating follow-up charge after adjustment of the example of the battery adopting the electrode group according to the embodiment to a shipment state.

As a result of performing the early adjustment shown in FIG. 7, the state of charge of the negative electrode becomes less than the state of charge of the positive electrode. When following charges are started in this state, the state can be treated as one where the position of the negative electrode potential curve (curve 12) with respect to the positive electrode potential curve (curve 13) has shifted to the right side, so that the positions in the lateral direction coincide between the state of charge of the positive electrode and the state of charge of the negative electrode corresponding to the charge capacity $C'_I$ of the adjusted battery, as shown in FIG. 8. In this state, the position in the lateral direction where the negative electrode potential begins to drop drastically in the vicinity of the full-charge capacity $C'_F$ corresponds to a higher potential on the positive electrode potential curve (curve 13). Therefore, when charge and discharge are performed in this state, higher potentials of the positive electrode can be utilized.

The decrease in the state of charge of the negative electrode indicated by the sliding S in FIG. 7 may be attributed to the diffusion of lithium ions from the facing section to the non-facing sections of the negative electrode in the battery adjusted to the initial-charged state. In the battery which adopts the electrode group having a value of $(L \times M_a)/(p/n)$ in the range of 40 mg/m to 60 mg/m, after the battery is adjusted to the initial-charged state (FIG. 6), lithium ions diffuse from the facing section to the non-facing sections in the negative electrode (FIG. 7). Since the lithium ions diffused to the non-facing sections of the negative electrode are immobilized in the non-facing sections, the lithium ions remain in the non-facing sections even when the battery is discharged, and further drifting of the lithium ions to the non-facing sections become difficult even when the battery is additionally charged. Namely, the rate at which the state of charge of the negative electrode decreases is suppressed, and becomes equivalent to the rate at which the state of charge of the positive electrode decreases. Therefore, even when charge and discharge are repeated, the balance of the state of charge between the positive electrode and negative electrode is maintained in the relationship observed when the early adjustment is completed (FIG. 8).

The shift of operation range between the positive electrode and the negative electrode will be described with reference to FIGS. 9 and 10.

Figure 9:
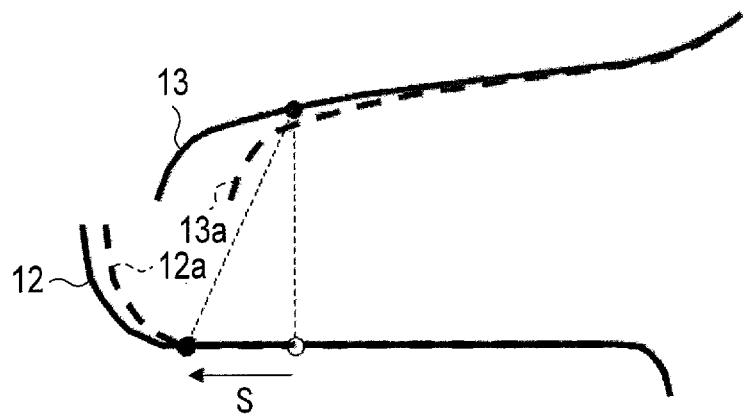
FIG. 9 is a conceptual diagram illustrating an example of shift of operation range.
Figure 10:
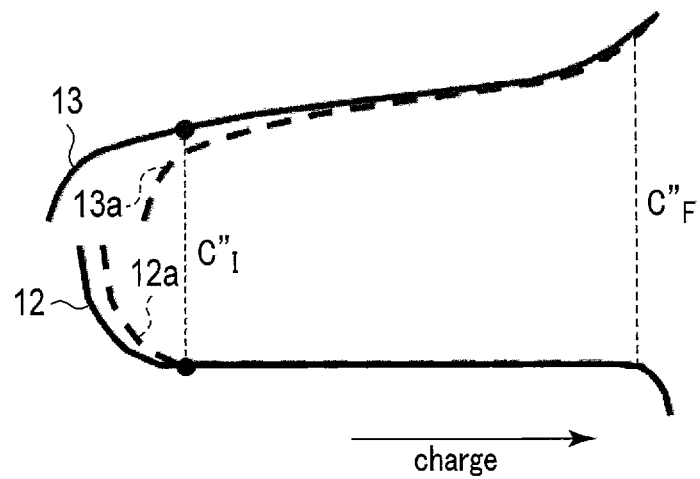
FIG. 10 is a conceptual diagram illustrating follow-up charge after occurrence of the example of the shift of operation range illustrated in FIG. 9.

FIG. 9 is a conceptual diagram illustrating an example of the shift of operation range. FIG. 10 is a conceptual diagram illustrating follow-up charge after occurrence of the shift of operation range given as an example in FIG. 9. Since the reference signs in FIGS. 9 and 10 are the same as those in FIGS. 6 to 8, a description thereof will be omitted.

In a battery which adopts an electrode group that is not designed appropriately, the difference between the rate of change in the state of charge of the positive electrode and the rate of change in the state of charge of the negative electrode may be great. For example, in a battery having a design where self-discharge of the negative electrode easily proceeds, decrease in the state of charge of the negative electrode may proceed significantly faster than that of the positive electrode, as indicated by the sliding S in FIG. 9. As a result, a large difference in the state of charge arises between the negative electrode and positive electrode. When following charges are started thereafter, the state can be treated as one where the position of the negative electrode potential curve (curve 12) is inclined toward the charge side (right side in FIG. 10) relative to the position of the positive electrode potential curve (curve 13), so that the positions in the lateral direction coincide between the state of charge of the positive electrode and the state of charge of the negative electrode corresponding to the charge capacity $C''_I$ of the battery, as shown in FIG. 10. In this state, the position of the full-charge capacity $C''_F$ in the lateral direction has moved near the right end of the positive electrode potential curve (curve 13). Therefore, when charge and discharge are performed in this state, the positive electrode may be exposed to a significantly high potential, where there is risk of the positive electrode degrading. If the nominal capacity of the battery is set lower than the full-charge capacity $C''_F$ shown in FIG. 10, for example, in order to prevent an excessive increase in the positive electrode potential, the battery capacity that can be substantially used decreases.

Otherwise, in a battery which adopts an electrode group that is not designed appropriately, lithium ions may drift from the facing section to the non-facing sections in the negative electrode, even during following charges and repeated charge-discharge cycles. For example, in a battery which adopts an electrode group designed with the value of $(L \times M_a)/(p/n)$ not falling within the range of 40 mg/m to 60 mg/m, lithium ions do not become immobilized in the non-facing sections of the negative electrode during an initial stage of charge; therefore, lithium ions drift from the facing section to the non-facing sections in the negative electrode every time following charges or repeated charge and discharge are performed. As a result, the shift of operation range progresses every time charge and discharge are performed, leading to an imbalance between the state of charge of the positive electrode and the state of charge of the negative electrode.

For example, if lithium ions are not immobilized in the non-facing sections of the negative electrode during early charge, the shift of operation range may proceed as follows. The charge-discharge balance between the positive electrode and the negative electrode may change from the positional relationship shown in FIG. 6, in which the overlap between the positive electrode potential curve (curve 13) and the negative electrode potential curve (curve 12) in the lateral direction is little, to the positional relationship shown in FIG. 8, in which the curves overlap almost entirely in the lateral direction due to the early charge. However, since lithium ions are not immobilized in the non-facing sections of the negative electrode, lithium ions drift from the facing section to the non-facing sections of the negative electrode during charges that follow. Since lithium ions flow out of the facing section of the negative electrode, self-discharge of the negative electrode proceeds, and the position of the negative electrode potential curve (curve 12) shifts further toward the charge side (right side in the figure). Accordingly, the positive electrode potential curve (curve 13) and the negative electrode potential curve (curve 12) may be shifted to the opposite sides in the lateral direction, for example, resulting in the positional relationship shown in FIG. 10, in which the overlap between the curves has become little, again.

The positive electrode active material-containing layer preferably contains a lithium-containing nickel-cobalt-manganese composite oxide represented by $Li_{1-x}Ni_{1-a-b}Co_aMn_bO_2$ (satisfying $-0.2 \leq x \leq 0.5$, $0 < a \leq 0.4$, and $0 < b \leq 0.4$) as the positive electrode active material. When the lithium-containing nickel-cobalt-manganese composite oxide is contained, diffusion of lithium ions into the non-facing sections of the negative electrode can be promoted. This is considered to be by virtue of self-discharge due to migration of lithium ions between the positive and negative electrodes being suppressed, because the lithium-containing nickel-cobalt-manganese composite oxide has high structural stability.

In the above lithium-containing nickel-cobalt-manganese composite oxide, the molar ratio x may vary via insertion and extraction of lithium ions. There is tendency for the molar ratio x to increase as charge proceeds and for the molar ratio x to decrease as discharge proceeds. When the molar ratio a of Co is 0.4 or less, the thermal stability as an active material can be secured. When the molar ratio b of Mn is 0.4 or less, the discharge capacity can be secured.

The positive electrode active material-containing layer may contain $Li_{1-x}Ni_{1-a-b}Co_aMn_bO_2$ alone as the positive electrode active material. Alternatively, the positive electrode active material-containing layer may contain $Li_{1-x}Ni_{1-a-b}Co_aMn_bO_2$ as a first positive electrode active material and also contain another compound as a second positive electrode active material. Examples of such another compound as the second positive electrode active material include lithium manganese composite oxides (e.g., $Li_yMn_2O_4$, $Li_yMnO_2$, $0<y\leq1$), lithium nickel composite oxides (e.g., $LiNiO_2$), lithium cobalt composite oxides ($LiCoO_2$), lithium nickel-cobalt composite oxides (e.g., $LiNi_{1-z}Co_zO_2$, $0<z<1$), lithium manganese-cobalt composite oxides (e.g., $LiMn_zCo_{1-z}O_2$, $0<z<1$), and lithium iron phosphate of an olivine structure (e.g., $Li_yFePO_4$, $0<y\leq1$). The second positive electrode active material used may be one or be two or more.

The proportion of the first positive electrode active material $Li_{1-x}Ni_{1-a-b}Co_aMn_bO_2$ in the positive electrode active material is preferably from 10% by mass to 100% by mass with respect to the total amount of the first positive electrode active material and the second positive electrode active material.

The negative electrode active material-containing layer preferably contains lithium titanate having a spinel structure represented by $Li_{4+w}Ti_5O_{12}$ and satisfying $-0.5\leq w\leq3$, as the negative electrode active material. The molar ratio w may vary within the range of −0.5 to 3 depending on the charge-discharge state. The negative electrode active material-containing layer may contain lithium titanate of a spinel structure alone. Alternatively, the negative electrode active material-containing layer may contain the above lithium titanate as the first negative electrode active material and another compound as the second negative electrode active material. Examples of the second negative electrode active material may include titanium-containing oxides such as monoclinic titanium dioxides ($Li_tTiO_2(B)$; the molar ratio t varies within the range of 0 to 1 depending on the charge-discharge state), lithium titanium composite oxides having a ramsdellite structure ($Li_{2+u}Ti_3O_7$; the molar ratio u varies within the range of 0 to 2 depending on the charge-discharge state), and monoclinic niobium-titanium composite oxides (e.g., $Li_vNb_2TiO_7$; the molar ratio v varies within the range of 0 to 4 depending on the charge-discharge state). Other examples of the second negative electrode active material include carbon materials and metal compounds. The second negative electrode active material used may be one or be two or more.

The proportion of the first negative electrode active material $Li_{4+w}Ti_5O_{12}$ in the negative electrode active material is preferably from 30% by mass to 100% by mass with respect to the total amount of the first negative electrode active material and the second negative electrode active material.

The negative electrode active material containing the above lithium titanate may be contained as negative electrode active material particles in the negative electrode active material-containing layer. The average primary particle size of the negative electrode active material particles is preferably 5 μm or less. When the average primary particle size is 5 μm or less, diffusion within the negative electrode active material particles becomes favorable. Therefore, the negative electrode adopting the negative electrode active material particles having an average primary particle size of 5 μm or less has excellent diffusibility of charged lithium ions from the facing section to the non-facing sections.

The composition of the component mix containing the negative electrode active material is preferably the same between the facing section and the non-facing sections of the negative electrode active material-containing layer. When the composition of the mix is the same between the facing section and the non-facing sections of the negative electrode active material-containing layer, diffusion of lithium ions from the facing section to the non-facing sections becomes favorable. The component mix of the negative electrode active material-containing layer may contain, for example, an electro-conductive agent and a binder described later, in addition to the negative electrode active material.

It is preferable to use together, a positive electrode in which the proportion of $Li_{1-x}Ni_{1-a-b}Co_aMn_bO_2$ in the positive electrode active material is from 10% by mass to 100% by mass and a negative electrode in which the proportion of $Li_{4+w}Ti_5O_{12}$ in the negative electrode active material is from 30% by mass to 100% by mass. The difference in the initial charge-discharge efficiency between such a positive electrode and negative electrode is appropriately great. Because of this, in a battery which adopts an electrode group including a positive electrode and a negative electrode in such a combination, the charge-discharge balance between the positive electrode and the negative electrode during initial charge tends to have the positional relationship shown in FIG. 6. Therefore, when the positive electrode active material containing $Li_{1-x}Ni_{1-a-b}Co_aMn_bO_2$ in the above proportion and the negative electrode active material containing $Li_{4+w}Ti_5O_{12}$ in the above proportion are used in combination in the electrode group according to the embodiment, the charge-discharge balance between the positive electrode and the negative electrode after the early adjustment is apt to be in the preferable positional relationship shown in FIG. 8, and the negative electrode active material-containing layer containing lithium ions immobilized in the non-facing sections can be easily obtained.

On the other hand, in a battery which adopts an electrode group including a combination of a negative electrode containing 100% by mass of a monoclinic niobium-titanium composite oxide as a negative electrode active material and the above-described positive electrode, the effects of the electrode group according to the embodiment are difficult to obtain. As another example, when a positive electrode containing 100% by mass of a lithium manganese composite oxide as a positive electrode active material is combined with the above-described negative electrode, as well, the aforementioned effects are difficult to obtain. In such combinations, the difference in the initial charge-discharge efficiency between the positive electrode and the negative electrode is little. That is, in these combinations, the charge-discharge balance between the positive electrode and the negative electrode during initial charge may be of the positional relationship shown in FIG. 8 from the beginning. As a result of the reduction of the state of charge of the negative electrode by the charge performed in the early stage, the charge-discharge balance may attain the positional relationship shown in FIG. 10. The battery thus obtained has a risk that the potential of the positive electrode becomes too high or experiences a decrease in the capacity that can be substantially used.

Hereinafter, the negative electrode, the positive electrode, and the separator, will be described in more detail.

(1) Positive Electrode

As the positive electrode current collector, there may be used a sheet containing a material having high electrical conductivity. For example, aluminum foil or aluminum alloy foil may be used as the positive electrode current collector. When aluminum foil or aluminum alloy foil is used, a thickness thereof is preferably 20 μm or less. The aluminum alloy foil may contain magnesium (Mg), zinc (Zn), silicon (Si), or the like. In addition, the aluminum alloy foil may contain other transition metals. Examples of transition metals include iron (Fe), copper (Cu), nickel (Ni), and chromium (Cr). A content of such transition metals (iron, copper, nickel, chromium) contained in the aluminum alloy foil, is preferably 1% by mass or less.

The positive electrode active material-containing layer may further contain a positive electrode electro-conductive agent and a binder, in addition to the positive electrode active material.

The positive electrode electro-conductive agent is used to enhance the current collection performance, as needed. The positive electrode electro-conductive agent is, for example, acetylene black, carbon black, or graphite. The species of the electro-conductive agent used may be one species or be two or more species.

The binder contained in the positive electrode is used for binding the positive electrode active material with the positive electrode current collector. Examples of the binder which may be contained in the positive electrode include polytetrafluoroethylene (PTFE), polyvinylidene fluoride (PVdF), fluorine rubber, styrene-butadiene rubber (SBR), polypropylene (PP), polyethylene (PE), and carboxymethyl cellulose (CMC). The species of the binder used may be one species or be two or more species.

The proportions of the positive electrode active material, the positive electrode electro-conductive agent, and the binder contained in the positive electrode active material-containing layer are preferably 80% by mass to 95% by mass, 3% by mass to 20% by mass, and 2% by mass to 7% by mass, respectively.

The positive electrode may be fabricated, for example, by the following procedure. First, a slurry is prepared by introducing the positive electrode active material, electro-conductive agent, and binder into an appropriate solvent. As the solvent, for example, N-methylpyrrolidone (NMP) may be used. This slurry is applied onto the surface of the positive electrode current collector, and the coat is dried. The slurry may be applied only to one principal face of the positive electrode current collector.

Alternatively, the slurry may be applied to both of one principal face and the other principal face on the reverse side of the positive electrode current collector. The dried coat is pressed to obtain positive electrode active material-containing layer having a desired density. Thereby, the positive electrode is finished.

(2) Negative Electrode

As the negative electrode current collector, there may be used a sheet containing a material having high electrical conductivity. For example, aluminum foil or aluminum alloy foil may be used as the negative electrode current collector. When aluminum foil or aluminum alloy foil is used, a thickness thereof is preferably 20 μm or less. The aluminum alloy foil may contain magnesium, zinc, silicon, or the like. In addition, the aluminum alloy foil may contain other transition metals. Examples of transition metals include iron (Fe), copper (Cu), nickel (Ni), and chromium (Cr). A content of such transition metals (iron, copper, nickel, chromium) contained in the aluminum alloy foil, is preferably 1% by mass or less.

The negative electrode active material-containing layer may further contain a negative electrode electro-conductive agent and a binder, in addition to the negative electrode active material.

The negative electrode electro-conductive agent is used to enhance the current collection performance, as needed. The negative electrode electro-conductive agent is, for example, a carbon material. As the carbon material, preferred is a material with high capability of having alkali metal inserted and electro-conductivity. The carbon material includes, for example, acetylene black, carbon black, graphite, and the like. The species of the electro-conductive agent used may be one species or be two or more species.

The binder contained in the negative electrode is used for binding the negative electrode active material particles with the negative electrode current collector. The binder may include, for example, polytetrafluoroethylene (PTFE), polyvinylidene fluoride (PVdF), fluorine rubber, styrene-butadiene rubber (SBR), polypropylene (PP), polyethylene (PE), and carboxymethyl cellulose (CMC). The species of the binder used may be one species or be two or more species.

The proportions of the negative electrode active material, negative electrode electro-conductive agent, and binder contained in the negative electrode active material-containing layer are preferably 70% by mass to 95% by mass, 0% by mass to 25% by mass, and 2% by mass to 10% by mass, respectively.

The negative electrode may be fabricated, for example, by the following procedure. First, a slurry is prepared by introducing the negative electrode active material, electro-conductive agent, and binder into an appropriate solvent. As the solvent, for example, N-methylpyrrolidone (NMP) may be used. This slurry is applied onto the surface of the negative electrode current collector, and the coat is dried. The slurry may be applied only to one principal face of the negative electrode current collector. Alternatively, the slurry may be applied to both of one principal face and the other principal face on the reverse side of the negative electrode current collector. The dried coat is pressed to obtain negative electrode active material-containing layer having a desired density. Thereby, the negative electrode is finished.

(3) Separator

As the separator, there may be used, for example, a synthetic resin nonwoven fabric, a polyolefin porous film such as a porous polyethylene film and a polypropylene porous film, or a cellulose-based separator. A separator formed as a composite of these materials, for example, a separator made of a polyolefin porous film and cellulose, may also be used.

The separator preferably includes pores having a diameter of from 10 μm to 100 μm. The thickness of the separator is preferably from 2 μm to 30 μm.

<Production Method of Electrode Group>

The electrode group according to the embodiment can be produced, for example, as described below.

A positive electrode, negative electrode, and separator(s) are prepared. The positive electrode and the negative electrode can be produced by, for example, the method described above. At this time, the dimensions, the species of the electrode active material, the content proportion of the electrode active material, the mass per unit area of the active material-containing layer, and the like are adjusted for each electrode, so that the value of $(L \times M_a)/(p/n)$ between the positive electrode and the negative electrode will be from 40 mg/m to 60 mg/m. The separator, the positive electrode, the separator, and the negative electrode are stacked in this order to obtain a stack. In the case of using a strip-shaped positive electrode and a strip-shaped negative electrode, it is desirable to adjust the arrangement of the positive electrode and the negative electrode so that the negative electrode protrudes from both of the long sides of the strip-shaped positive electrode. The stack thus obtained is wound so that the center of the spiral lies along the short-side direction. For example, the stack is wound so that the outermost layer will be the negative electrode. Optionally, the wound stack may be pressed.

<Measurement Methods for Electrode Group>

Methods for measuring the electrode group will be described below.

When the electrode group to be measured is included in a battery, the electrode group is extracted as described below.

(Taking Out the Electrode Group)

First, the battery including the target electrode group is brought into a discharged state. The battery is disassembled in a glove box under an inert gas atmosphere such as of argon (Ar). In the glove box, the electrode group is taken out from the container member. At this time, an electrode connected to the negative electrode terminal of the battery can be determined as being the negative electrode, and an electrode connected to the positive electrode terminal of the battery can be determined as being the positive electrode. The electrode group may be connected to the electrode terminals via electrode leads. The electrode group is carefully detached from the electrode leads. For example, the connection with the electrode leads can be cut using scissors, pliers, a cutter, or the like while holding the electrode group so that the positions of the positive electrode, the separator, and the negative electrode are fixed within the electrode group.

(Taking Out the Electrodes)

The electrode group is disassembled in the glove box, and the positive electrode and the negative electrode are taken out. The taken out positive and negative electrodes are washed with an organic solvent such as ethyl methyl carbonate. For example, the positive and negative electrodes are washed with ethyl methyl carbonate for 60 seconds. Thereafter, the positive and negative electrodes are air-dried to obtain a measurement sample.

(Examination of Dimensions of Electrodes and Mass Per Unit Area of Active Material-Containing Layers)

For the measurement sample obtained as described above, dimensions such as the thicknesses of the electrodes and the widths of the electrodes (a first width of the positive electrode and a second width of the negative electrode) are measured using, for example, a ruler. The total length L of the widths (L1 and L2) of the non-facing sections of the negative electrode can be calculated from the difference between the second width of the negative electrode and the first width of the positive electrode.

The mass per unit area of the active material-containing layers (e.g., the mass per unit area $M_a$ of the negative electrode active material-containing layer) can be calculated as follows. Square pieces of 2 cm×2 cm are cut out from a part of the negative electrode. The negative electrode active material-containing layer is wiped off from another part of the negative electrode using a solvent such as N-methylpyrrolidone to obtain a state of only a current collector. Square pieces of 2 cm×2 cm are cut out from the exposed portion consisting only of the current collector. The mass of each of the square pieces cut out from the negative electrode and the current collector is measured. The mass per unit area of the negative electrode active material-containing layer is calculated based on the measured mass.

(Calculation of Positive-Negative Electrode Capacity Ratio p/n)

The positive electrode sample and the negative electrode sample obtained as described above are each cut out into a circular shape having a diameter of 1 cm to prepare working electrodes. A coin cell is prepared using each of the working electrodes with Li metal used as a counter electrode/reference electrode. The charge capacity respectively of the positive electrode and the negative electrode is measured using each of the coin cells. For the measurement of the coin cell using the positive electrode, for example, measurement conditions of a current value of 5 mAh, a voltage range of 3 V to 4.2 V, and an ambient temperature of 25° C. are employed. For the measurement of the coin cell using the negative electrode, for example, measurement conditions of a current value of 5 mAh, a voltage range of 1.3 V to 2.0 V, and an ambient temperature of 25° C. are employed. The capacity ratio p/n of the negative electrode capacity to the positive electrode capacity is calculated by the mathematical formula of [positive electrode charge capacity]/[negative electrode charge capacity].

<Measurement of Composition of Active Material>

The composition of active materials contained in the electrodes can be measured as follows.

From the electrode as measurement sample, the active material-containing layer is dislodged using, for example, a spatula and the like, and a powder-form sample is obtained.

By powder X-ray diffraction (XRD) measurement of the powder-form sample, a crystal structure of the active material is identified.

The measurement is performed within a measurement range where 2θ is from 10 degrees to 90 degrees, using Cu—Kα ray as a radiation source. By this measurement, X-ray diffraction patterns of compounds contained in selected particles can be obtained.

As an apparatus for powder X-ray diffraction measurement, SmartLab manufactured by Rigaku is used, for example. Measurement is performed under the following conditions:

X ray source: Cu target
Output: 45 kV, 200 mA
soller slit: 5 degrees in both incident and received light
step width: 0.02 deg
scan speed: 20 deg/min
semiconductor detector: D/teX Ultra 250
sample plate holder: flat glass sample plate holder (0.5 mm thick)
measurement range: range of $10° \leq 2θ \leq 90°$ When another apparatus is used, in order to obtain measurement results equivalent to those described above, measurement using a standard Si powder for powder X-ray diffraction is performed, and measurement is conducted with adjustments made to conditions where peak intensities and peak-top positions correspond to those obtained using the above apparatus.

Subsequently, the sample containing the active material is observed with a scanning electron microscope (SEM). SEM observation is also desirably performed in an inert atmosphere of argon or nitrogen, avoiding contact with air.

In a SEM observation image at 3000 times magnification, for example, several particles having the forms of primary particles or secondary particles examined within the field of view are selected. Whereupon, the particles are selected such that the particle size distribution of the selected particles is spread widely as possible. By EDX analysis of the observed active material particle, the species of the constituent elements and composition of the active material are specified. Accordingly, the species and amounts of the elements other than Li among the elements contained in the selected particles can be specified. Similar operations are performed for each of the plural active material particles, thereby judging the state of mixing of the active material particles.

Subsequently, the powder-form sample extracted from the active material-containing layer as mentioned above is washed with acetone and dried. The obtained powder is dissolved with hydrochloric acid, and after removing the electro-conductive agent by filtration, the solution is then diluted with ion exchange water to prepare a measurement sample. The ratio of metal contained in the measurement sample is calculated by inductively coupled plasma atomic emission spectroscopy (ICP-AES).

In the case where plural species of active materials are present, their mass ratio is estimated from the content ratio of elements unique to each active material. The ratio of the unique elements and active material mass is judged from the composition of the constituent elements determined by EDX analysis. For example, in a measurement sample obtained from the negative electrode active material-containing layer, along with lithium titanate as the first active material, another compound as the second active material may be included. In such a case, the chemical formula and formula weight for each of the first and second active materials is calculated from the obtained metal ratio, and the weight ratio of the first and second active materials included in a predetermined amount of extracted active material-containing layer is determined.

<Measurement of Average Primary Particle Size of Active Material Particles>

The average primary particle size of the active material particles can be obtained by, for example, Transmission Electron Microscope (TEM) observation.

The electrode as measurement sample is photographed using the TEM at a magnification at which primary particles can be clearly examined, for example, a magnification of 20,000× to 500,000×. Then among the primary particles included in the TEM image, a primary particle whose whole is apparent is selected. Next, the primary particle is approximated to an ellipse. In this approximation, the ratio of the long axis to the short axis of the ellipse is set such that the difference between the outline of the primary particle and the outline of the circumference of the ellipse is minimized. Next, the lengths of the long axis and the short axis of the ellipse are measured. The arithmetic mean value of the lengths of the long axis and the short axis of the thus obtained ellipse is recorded as the primary particle size. The same operation as described above is performed for 100 particles selected at random, and by calculating an arithmetic mean value of the 100 particles, the average primary particle size of the active material particles is obtained.

The electrode group according to the first embodiment includes a stack that includes a positive electrode and a negative electrode. The positive electrode includes a positive electrode current collector and a positive electrode active material-containing layer on the positive electrode current collector. The negative electrode includes a negative electrode current collector and a negative electrode active material-containing layer on the negative electrode current collector. A first width of the positive electrode active material-containing layer in a first direction is smaller than a second width of the negative electrode active material-containing layer in the first direction. The electrode group has a wound structure. In the wound structure, the stack is wound so that a center lies along the first direction. A length L corresponding to a difference between the second width and the first width, a mass per unit area $M_a$ of the negative electrode active material-containing layer per each side of the negative electrode current collector, and a ratio p/n of a capacity p of the positive electrode to a capacity n of the negative electrode satisfy a relationship of 40 mg/m≤(L× $M_a$)/(p/n)≤60 mg/m. A battery employing the electrode group is excellent in capacity retention ratio upon repeating charge-discharge cycles.

Second Embodiment

According to a second embodiment, a battery is provided. The battery includes the electrode group according to the first embodiment. The battery according to the embodiment may be, for example, a secondary battery. More specifically, the battery according to the embodiment may be, for example, a lithium ion secondary battery.

The battery according to the embodiment may further include an electrolyte. As the electrolyte, for example, a nonaqueous electrolyte may be included. Namely, the battery according to the embodiment may be a nonaqueous electrolyte secondary battery. The electrolyte may be held in the electrode group.

The battery according to the embodiment may further include a container member that houses the electrode group and the electrolyte.

The battery may further include a positive electrode terminal and a negative electrode terminal. The positive electrode terminal can serve as a conductor that allows electrons to move between the positive electrode and an external circuit, by having a part thereof electrically connect to a part of the positive electrode. The positive electrode terminal may be connected to, for example, the positive electrode current collector, particularly the positive electrode current collecting tab. Similarly, the negative electrode terminal can serve as a conductor that allows electrons to move between the negative electrode and external terminals, by having a part thereof electrically connect to a part of the negative electrode. The negative electrode terminal may be connected to, for example, the negative electrode current collector, particularly the negative electrode current collecting tab.

The battery according to the embodiment may further include a container member. The container member can house the electrode group and the electrolyte. In the container member, the electrolyte may be impregnated into the electrode group. A part of each of the positive electrode terminal and the negative electrode terminal may be extended out from the container member.

In addition, the battery may further include electrode leads. The electrode lead may be, for example, a positive electrode lead that electrically connects the positive electrode and the positive electrode terminal. Alternatively, the electrode lead may be, for example, a negative electrode lead that electrically connects the negative electrode and the negative electrode terminal.

Hereinafter, the electrolyte, the positive electrode terminal, the negative electrode terminal, and the container member will be described in more detail.

(4) Electrolyte

As the electrolyte, for example, a liquid nonaqueous electrolyte or gel nonaqueous electrolyte may be used.

The liquid nonaqueous electrolyte can be prepared by dissolving an electrolyte salt in a nonaqueous solvent such as an organic solvent. The gel nonaqueous electrolyte is prepared by obtaining a composite between the liquid nonaqueous electrolyte and a polymeric material.

As the nonaqueous solvent, a known nonaqueous solvent used for a nonaqueous electrolyte of a nonaqueous electrolyte battery may be used. A first example of nonaqueous solvent includes cyclic carbonates, such as ethylene carbonate (EC) and propylene carbonate (PC). A second example of nonaqueous solvent includes linear carbonates such as dimethyl carbonate (DMC), methylethyl carbonate (MEC), and diethyl carbonate (DEC); γ-butyrolactone (γ-BL), acetonitrile, methyl propionate, ethyl propionate; cyclic ethers such as tetrahydrofuran (THF) and 2-methyltetrahydrofuran; and linear ethers such as dimethoxyethane and diethoxyethane. A solvent of the second example generally has lower viscosity as compared to a solvent of the first example. The nonaqueous solvent may be a mixed solvent of a solvent of the first example and a solvent of the second example.

Preferred nonaqueous solvents include propylene carbonate. More preferred nonaqueous solvents include propylene carbonate and one, or two or more linear carbonates.

The electrolyte salt is, for example, an alkaline salt, and preferably a lithium salt. The electrolyte salt preferably includes a lithium salt containing F. Such a lithium salt includes, for example, lithium hexafluorophosphate ($LiPF_6$), lithium arsenic hexafluoride ($LiAsF_6$), or lithium trifluoromethanesulfonate ($LiCF_3SO_3$). The species of electrolyte salt used may be one species or be two or more species. Preferably, the electrolyte salt includes lithium hexafluorophosphate ($LiPF_6$). The concentration of the electrolyte salt in the electrolyte is preferably in the range from 0.5 mol/L to 2 mol/L.

Preferably, the electrolyte further includes difluorophosphate(s) and/or monofluorophosphate(s) as other additives. As such additives, there may be added only one or more difluorophosphates, or alternatively, there may be added only one or more monofluorophosphates. As a further alternative, one or more difluorophosphates and one or more monofluorophosphates may both be added. Examples of the difluorophosphates include lithium difluorophosphate ($LiPO_2F_2$). Examples of the monofluorophosphates include lithium monofluorophosphate ($Li_2PO_3F$).

When difluorophosphate(s) or monofluorophosphate(s) is included in the electrolyte, a coating film may be formed on the surface of the positive electrode and the surface of the negative electrode. This coating film can suppress self-discharge caused by unintended migration of lithium ions between the positive electrode and the negative electrode. In addition, diffusion of lithium ions to the non-facing sections of the negative electrode can be promoted during early charge, making the immobilization of lithium in the non-facing sections of the negative electrode more readily achievable.

When the electrolyte includes at least one of difluorophosphate(s) or monofluorophosphate(s), the first mass concentration of the difluorophosphate(s) with respect to the mass of the electrolyte, the second mass concentration of the monofluorophosphate(s) with respect to the mass of the electrolyte, or the total mass concentration of both salts is preferably from 1000 ppm to 30000 ppm.

(5) Positive Electrode Terminal and Negative Electrode Terminal

The positive electrode terminal and the negative electrode terminal are preferably made of a material having high electrical conductivity. In the case of connecting these terminals to the current collectors, the terminals are preferably made of the same material as the materials of the current collectors. By using the same material, contact resistance between the current collectors and the electrode terminals can be reduced. Similarly, the positive electrode lead and the negative electrode lead are preferably made of the same material as the materials of the corresponding terminals and current collectors.

(6) Container Member

As the container member, for example, a metallic container or a container made of a laminated film may be used. The form of the container member is not limited thereto.

By using a metallic container as the container member, a battery with excellent impact resistance and long-term reliability can be realized. By using a container made of a laminated film as the container member, a battery with excellent corrosion resistance can be realized, and the battery can be made light-weighted.

As the metallic container, for example, one having a plate thickness in the range of 0.2 mm to 5 mm may be used. The plate thickness of the metal container is more preferably 0.5 mm or less.

The metallic container preferably contains at least one metallic element selected from the group consisting of Fe, Ni, Cu, Sn, and Al. A metallic container may be made of, for example, aluminum or an aluminum alloy. An aluminum alloy containing element(s) such as magnesium, zinc, silicon, or the like is preferable. If the alloy contains a transition metal such as iron, copper, nickel, chromium or the like, the content thereof is preferably 1% by mass or less. Thus, long-term reliability and impact resistance under a high-temperature environment can be remarkably improved.

A thickness of the laminated film is, for example, within the range of 0.1 mm to 2 mm. The thickness of the laminated film is more preferably 0.2 mm or less.

The laminated film is composed of a multilayer film including, for example, a metal layer and resin layers sandwiching the metal layer. The laminated film may be a porous film composed, for example, of a metal layer and resin layer(s) coating the metal layer. The metal layer preferably contains a metal including at least one selected from the group consisting of Fe, Ni, Cu, Sn and Al. The metal layer is preferably an aluminum foil or an aluminum alloy foil, in view of lightening weight. As the resin layer, for example, a polymeric material such as polypropylene (PP), polyethylene (PE), nylon or polyethylene terephthalate (PET) may be used. The laminated film can be formed into a shape of a container member by performing heat sealing.

As a shape of the container member, a flat shape (thin shape), a prismatic shape, a cylindrical shape, a coin shape, a button shape and the like are given as examples. Various dimensions can be adopted for the container member depending on application. For example, when the battery according to the embodiment is used for a portable electronic device, the container member can be made compact according to the size of the electronic device onto which the battery is installed. Alternatively, in a case where the battery is installed onto a two-wheeled or four-wheeled automobile, a container for a large-sized battery may be used.

Next, an example of the battery according to the embodiment will be described in more detail with reference to the drawings.

Figure 11:
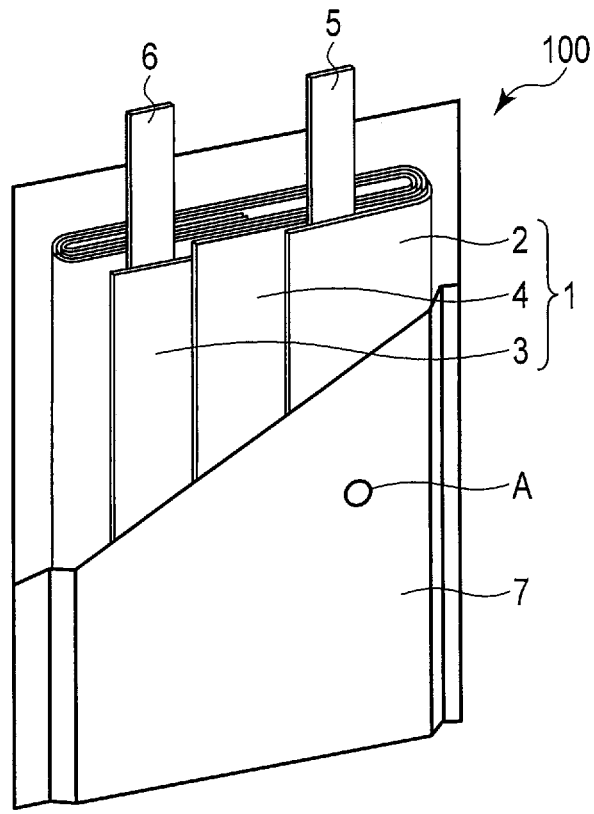
FIG. 11 is a partially cutaway perspective view of a first example of a battery according to an embodiment.
Figure 12:
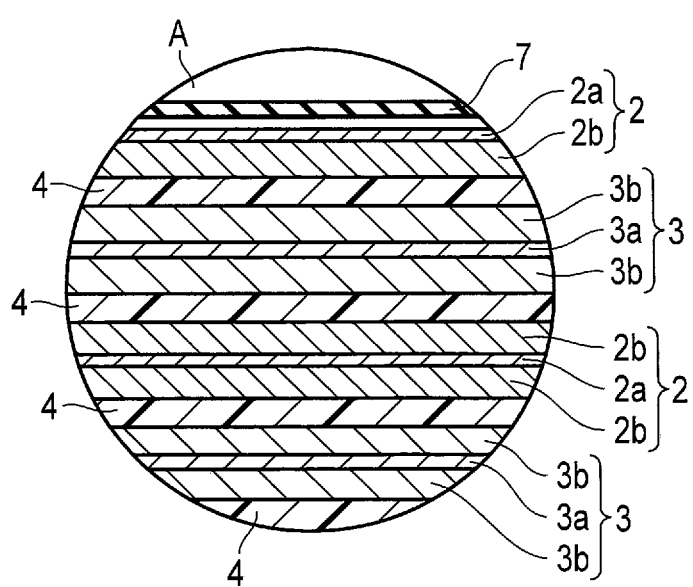
FIG. 12 is an enlarged sectional view of section A in FIG. 11.

FIG. 11 is a partially cutaway perspective view of a battery according to a first example of the embodiment. FIG. 12 is an enlarged sectional view of section A of the battery shown in FIG. 11.

The battery 100 shown in FIGS. 11 and 12 includes a flat electrode group 1.

The flat electrode group 1 includes a negative electrode 2, a positive electrode 3, and a separator 4.

As shown in FIG. 12, the negative electrode 2 includes a negative electrode current collector 2a and a negative electrode active material-containing layer 2b supported on the negative electrode current collector 2a. As shown in FIG. 12, the positive electrode 3 includes a positive electrode current collector 3a and a positive electrode active material-containing layer 3b supported on the positive electrode current collector 3a.

As shown in FIG. 11, the electrode group 1 has a flat-shaped wound structure. The flat-shaped wound structure may be, for example, a structure obtained by spirally winding a stack including the negative electrode 2, the positive electrode 3, and the separator 4 interposed so as to have a flat shape.

As shown in FIG. 11, in the battery 100, a belt-shaped negative electrode terminal 5 is electrically connected to the negative electrode 2. More specifically, the negative electrode terminal 5 is connected to the negative electrode current collector 2a. A belt-shaped positive electrode terminal 6 is electrically connected to the positive electrode 3. More specifically, the positive electrode terminal 6 is connected to the positive electrode current collector 3a.

The battery 100 further includes an exterior container 7 made of a laminated film as a container. That is, the battery 100 includes a container member composed of the exterior container 7 made of a laminated film.

The electrode group 1 is housed in the outer container 7 made of laminated film; however, the ends of the negative electrode terminal 5 and the positive electrode terminal 6 extend out from the exterior container 7. An unillustrated electrolyte is housed in the exterior container 7 made of laminated film. The electrolyte is impregnated into the electrode group 1. The periphery of the exterior container 7 is heat-sealed, whereby the electrode group 1 and the electrolyte are sealed in.

Next, a second example of the battery according to the embodiment will be described in detail with reference to FIG. 13.

Figure 13:
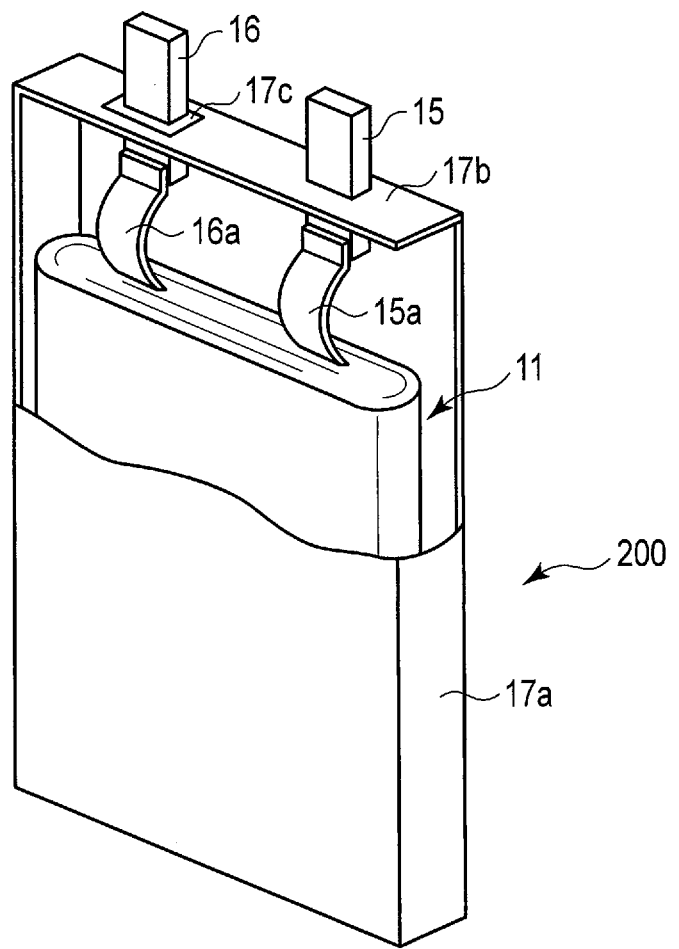
FIG. 13 is a partially cutaway perspective view of a second example of the battery according to the embodiment.

FIG. 13 is a partially cutaway perspective view of a battery according to a second example of the embodiment.

The battery 200 shown in FIG. 13 differs from the battery 100 of the first example in that the container member is composed of a metallic container 17a and a sealing plate 17b.

Like the electrode group 1 in the battery 100 of the first example, the flat electrode group 11 includes a negative electrode, a positive electrode, and a separator. The electrode group 11 has a structure similar to that of the electrode group 1. However, in the electrode group 11, a negative electrode lead 15a and a positive electrode lead 16a are respectively connected to the negative electrode and the positive electrode, instead of the negative electrode terminal 5 and the positive electrode terminal 6, as described later.

In the battery 200 shown in FIG. 13, such an electrode group 11 is housed in a metal container 17a. The metal container 17a further houses an unillustrated electrolyte. The metal container 17a is sealed by the sealing plate 17b made of a metal. The metal container 17a and the sealing plate 17b configure an outer can as the container member, for example.

One end of the negative electrode lead 15a is electrically connected to the negative electrode current collector and the other end is electrically connected to the negative electrode terminal 15. One end of the positive electrode lead 16a is electrically connected to the positive electrode current collector and the other end is electrically connected to the positive electrode terminal 16 fixed to the sealing plate 17b. The positive electrode terminal 16 is fixed to the sealing plate 17b via an insulating member 17c. The positive electrode terminal 16 and the sealing plate 17b are electrically insulated by the insulating member 17c.

<Production Method of Battery>

The battery according to the embodiment can be produced, for example, as follows.

The electrode group according to the first embodiment is prepared. For example, the electrode group is fabricated by the production method described above.

An electrolyte and container member are prepared. In the case of using the positive electrode lead and the negative electrode lead, these electrode leads are prepared.

A battery is assembled using the prepared components. It is desirable to perform an early adjustment with respect to the assembled battery. By performing early adjustment, diffusion of lithium ions to the non-facing sections of the negative electrode and immobilization of the lithium ions therein can be promoted. The early adjustment is made, for example, as described below.

The container member of the assembled battery is subjected to temporary sealing. The temporarily sealed battery is adjusted to an initial-charged state with a low SOC. For example, the battery is adjusted to an initial-charged state by being adjusted to an SOC of 10% to 40%. The temporarily sealed battery may be adjusted directly to an initial-charged state by performing the first charge on the battery. The initial-charged state herein is not limited to the state of charge reached by performing the first charge. Therefore, the battery may be adjusted to an initial-charged state by performing initial charge up to a fully charged state and then discharging the battery. As still another means, initial charge may be performed up to a fully charged state, then initial discharge down to a fully discharged state may be performed to examine an initial discharge capacity, and then the battery may be recharged up to an initial-charged state. In this case, the SOC in the initial-charged state can be calculated based on the initial discharge capacity.

Aging is performed by holding the battery adjusted to the initial-charged state under an atmosphere at a temperature of 50° C. to 70° C. The aging is performed for 15 hours to 25 hours, for example.

After aging, the seal of the temporarily sealed battery is desirably released to discharge the gas generated inside the battery during the aging. The container member of the battery is resealed.

Through the early adjustment, the battery in a shipment state is obtained.

<Measurement Methods of Battery>

Methods for measuring each member composing the battery will be described below.

(Measurement of Electrode Group and Electrodes)

The electrode group and the electrodes included in the battery can be measured by the same method as described in the first embodiment. Therefore, a description thereof will be omitted.

(Measurement of Electrolyte)

An amount of difluorophosphate(s) and monofluorophosphate(s) contained in the electrolyte of a battery can be determined by capillary electrophoresis.

An electrolyte collected from a battery which has been discharged and disassembled in the glove box under an inert gas atmosphere as described above is used as the measurement sample. The difluorophosphate(s), monofluorophosphate(s) or both salts contained in the measurement sample is subjected to detection by electrophoresis. Based on the results of detection, an amount of difluorophosphate(s), monofluorophosphate(s), or both contained in the battery can be obtained.

An example of electrophoresis conditions is shown below:
capillary: internal diameter 50 μm, length 72 cm
applied voltage: −30 kV
temperature: 15° C.
running buffer: buffer for inorganic anion analysis manufactured by Agilent Technologies
detection wavelength: Signal=350 (±80) nm, ref=245 (±10) nm (indirect absorbance method)
measurement time: 15 minutes.

The above buffer for inorganic anion analysis manufactured by Agilent Technologies is composed of water, sodium hydroxide, 1,2,4,5-benzenetetracarboxylic acids, triethanolamine, and hexamethonium bromide.

The battery according to the second embodiment includes the electrode group according to the first embodiment. In the battery, capacity decrease upon repeating charge-discharge cycles is suppressed. Accordingly, the battery according to the embodiment is excellent in capacity retention ratio.

Third Embodiment

According to a third embodiment, a battery pack is provided. The battery pack includes the battery according to the second embodiment.

The battery pack according to the embodiment may include plural batteries. The plural batteries may be electrically connected in series or in parallel. Alternatively, the plural batteries may be electrically connected in combination of in series and in parallel. The electrically connected batteries may configure a battery module. Namely, the battery pack according to the embodiment may include a battery module.

The battery pack according to the embodiment may include plural battery modules. The plural battery modules may be electrically connected in series, in parallel, or in combination of in series and in parallel.

The battery pack according to the embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of automobiles and the like) is provided to the battery pack via the external power distribution terminal.

Next, an example of a battery pack according to the embodiment will be described with reference to the drawings.

Figure 14:
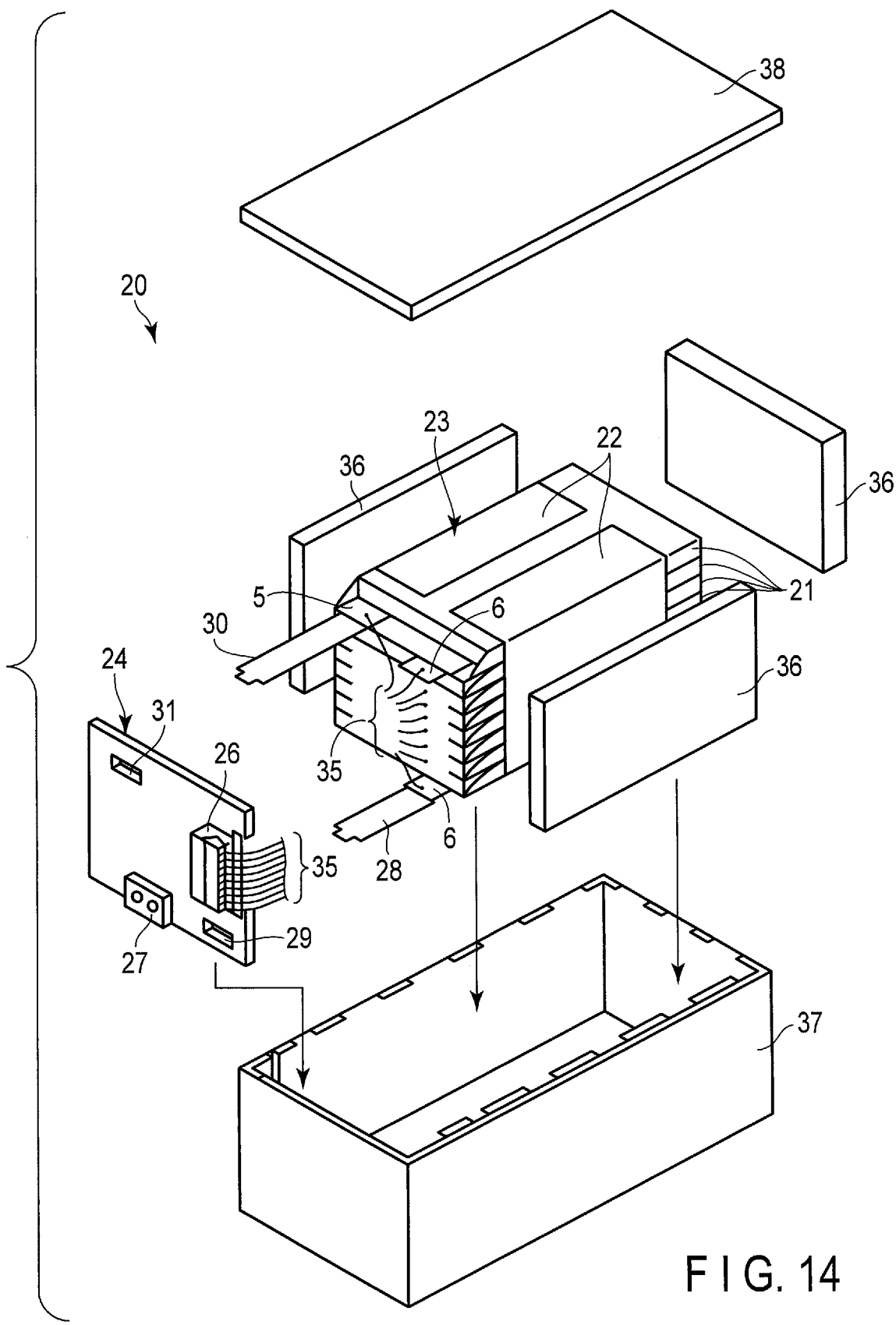
FIG. 14 is an exploded perspective view of an example of a battery pack according to an embodiment.
Figure 15:
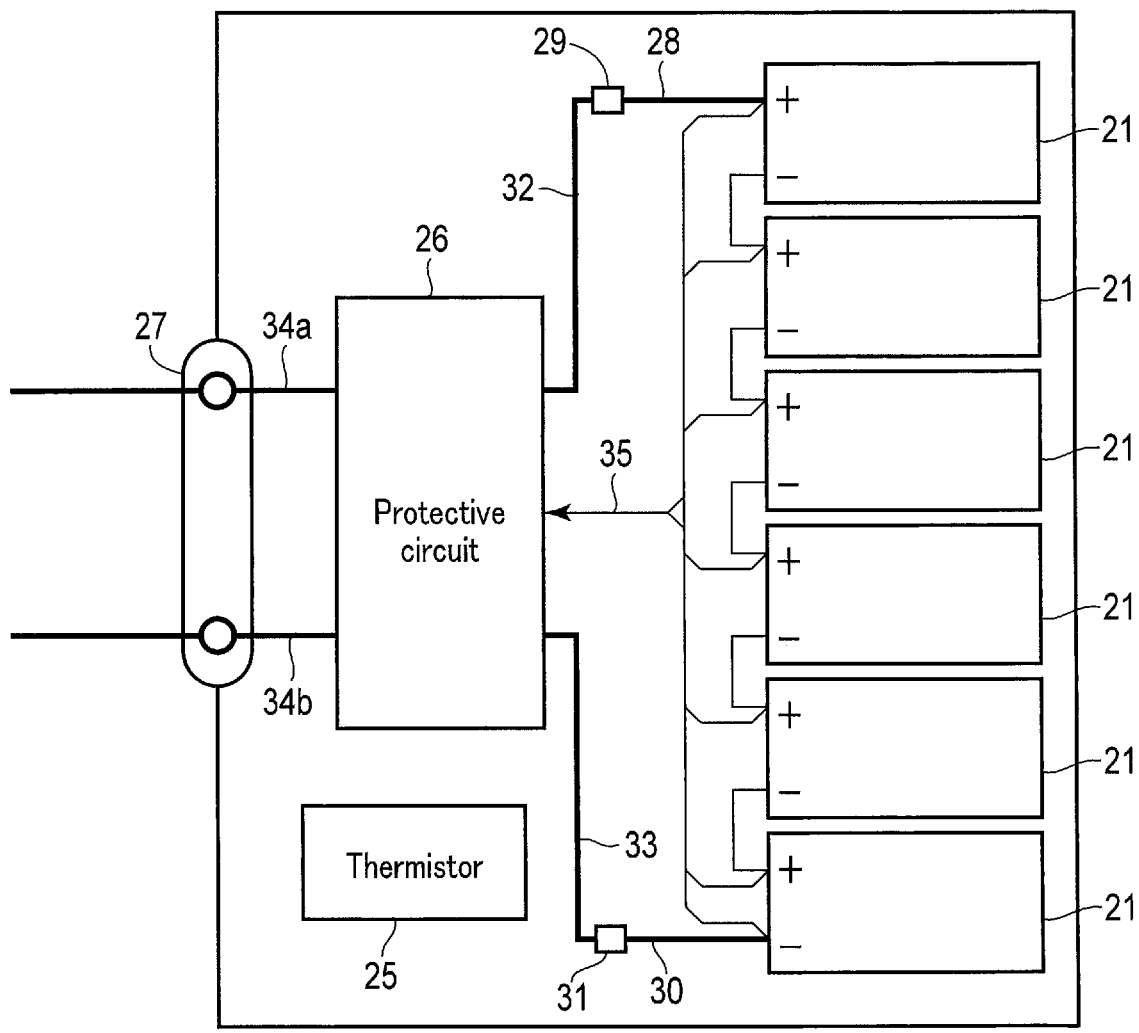
FIG. 15 is a block diagram showing an electric circuit of the battery pack shown in FIG. 14.

FIG. 14 is an exploded perspective view of one example of a battery pack according to the embodiment. FIG. 15 is a block diagram showing one example of an electric circuit of the battery pack shown in FIG. 14.

A battery pack 20 shown in FIGS. 14 and 15 includes a housing container 37, a lid 38, protective sheets 36, a battery module 23, a printed wiring board 24, wires 35, and an unillustrated insulating plate.

The housing container 37 shown in FIG. 14 is a prismatic bottomed container having a rectangular bottom surface. The housing container 37 is configured to be capable of housing the protective sheets 36, the battery module 23, the printed wiring board 34, and the wires 35. The lid 38 has a rectangular shape. The lid 38 covers the housing container 37 to house the battery module 23 and such. Although not illustrated, the housing container 37 and the lid 38 are provided with openings, connection terminals, or the like for connection to an external device or the like.

The battery module 23 includes plural single-batteries 21, a positive electrode-side lead 28, a negative electrode-side lead 30, and adhesive tape(s) 22.

At least one of the plural single-batteries 21 is a battery according to the second embodiment. The plural single-batteries 21 are electrically connected in series, as shown in FIG. 15. The plural single-batteries 21 may be electrically connected in parallel, or connected in a combination of in-series connection and in-parallel connection. If the plural single-batteries 21 are connected in parallel, the battery capacity increases as compared to a case in which they are connected in series.

The adhesive tape(s) 22 fastens the plural single-batteries 21. The plural single-batteries 21 may be fixed using a heat shrinkable tape in place of the adhesive tape(s) 22. In this case, protective sheets 36 are arranged on both side surfaces of the battery module 23, and after the heat shrinkable tape is wound around, the heat shrinkable tape is shrunk by heating to bundle the plural single-batteries 21.

One end of the positive electrode-side lead 28 is connected to the battery module 23. The one end of the positive electrode-side lead 28 is electrically connected to the positive electrode(s) of one or more single-battery 21. For example, the positive electrode-side lead 28 may be connected to a positive electrode terminal 6 of a single-battery 21. One end of the negative electrode-side lead 30 is connected to the battery module 23, in the stack of the single-batteries 21. The one end of the negative electrode-side lead 30 is electrically connected to the negative electrode(s) of one or more single-battery 21. For example, the negative electrode-side lead 30 may be connected to a negative electrode terminal 5 of a single-battery 21.

The printed wiring board 24 is provided along one face in the short side direction among the inner surfaces of the housing container 37. The printed wiring board 24 includes a positive electrode-side connector 29, a negative electrode-side connector 31, a thermistor 25, a protective circuit 26, wirings 32 and 33, an external power distribution terminal 27, a plus-side wiring (positive-side wiring) 34a, and a minus-side wiring (negative-side wiring) 34b. One principal surface of the printed wiring board 24 faces one side surface, of the battery module 23. The unillustrated insulating plate is disposed in between the printed wiring board 24 and the battery module 23.

The other end of the positive electrode-side lead 28 is electrically connected to the positive electrode-side connector 29. The other end of the negative electrode-side lead 30 is electrically connected to the negative electrode-side connector 31.

The thermistor 25 is fixed to one principal surface of the printed wiring board 24. The thermistor 25 detects the temperature of each single-battery 21 and transmits detection signals to the protective circuit 26.

The external power distribution terminal 27 is fixed to the other principal surface of the printed wiring board 24. The external power distribution terminal 27 is electrically connected to device(s) that exists outside the battery pack 20.

The protective circuit 26 is fixed to the other principal surface of the printed wiring board 24. The protective circuit 26 is connected to the external power distribution terminal 27 via the plus-side wiring 34a. The protective circuit 26 is connected to the external power distribution terminal 27 via the minus-side wiring 34b. In addition, the protective circuit 26 is electrically connected to the positive electrode-side connector 29 via the wiring 32. The protective circuit 26 is electrically connected to the negative electrode-side connector 31 via the wiring 33. Furthermore, the protective circuit 26 is electrically connected to each of the plural single-batteries 21 via the wires 35.

The protective sheets 36 are arranged on both inner surfaces of the housing container 37 along the long side direction and on an inner surface along the short side direction facing the printed wiring board 23 across the battery module 23. The protective sheets 36 are made of, for example, resin or rubber.

The protective circuit 26 controls charge and discharge of the plural single-batteries 21. The protective circuit 26 is also configured to cutoff electric connection between the protective circuit 26 and the external power distribution terminal 27 to external device(s), based on detection signals transmitted from the thermistor 25 or detection signals transmitted from each single-battery 21 or the battery module 23.

An example of the detection signal transmitted from the thermistor 25 is a signal indicating that the temperature of the single-battery(s) 21 is detected to be a predetermined temperature or more. An example of the detection signal transmitted from each single-battery 21 or the battery module 23 include a signal indicating detection of over-charge, over-discharge, and overcurrent of the single-battery(s) 21. When detecting over charge or the like for each of the single batteries 21, the battery voltage may be detected, or a positive electrode potential or negative electrode potential may be detected. In the latter case, a lithium electrode to be used as a reference electrode is inserted into each single battery 21.

Note, that as the protective circuit 26, a circuit included in a device (for example, an electronic device or an automobile) that uses the battery pack 20 as a power source may be used.

As described above, the battery pack 20 includes the external power distribution terminal 27. Hence, the battery pack 20 can output current from the battery module 23 to an external device and input current from an external device to the battery module 23 via the external power distribution terminal 27. In other words, when using the battery pack 20 as a power source, the current from the battery module 23 is supplied to an external device via the external power distribution terminal 27. When charging the battery pack 20, a charge current from an external device is supplied to the battery pack 20 via the external power distribution terminal 27. In a case where the battery pack 20 is used as an onboard battery, the regenerative energy of the motive force of the vehicle can be used as the charge current from the external device.

Note that the battery pack 20 may include plural battery modules 23. In this case, the plural battery modules 23 may be connected in series, connected in parallel, or connected in a combination of in-series connection and in-parallel connection. The printed wiring board 24 and the wires 35 may be omitted. In this case, the positive electrode-side lead 28 and the negative electrode-side lead 30 may be used as the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment includes the battery according to the second embodiment. Accordingly, the battery pack is excellent in capacity retention ratio upon repetition of charge-discharge cycles.

EXAMPLES

Hereinafter, the above embodiments will be described in more detail based on examples.

Example 1

<Fabrication of Positive Electrode>

$LiNi_{0.33}Co_{0.33}Mn_{0.33}O_2$ (alternative notation: $LiNi_{1/3}Co_{1/3}Mn_{1/3}O_2$) as positive electrode active material, carbon black as electro-conductive agent, and polyvinylidene fluoride as binder were prepared. These materials were mixed at a weight ratio of 90:5:5 to obtain a mixture.

Next, the obtained mixture was dispersed in n-methylpyrrolidone (NMP) solvent to prepare a slurry. In preparing the slurry, New Visco Mill (NVM-2) manufactured by Aimex was used. The obtained slurry was applied onto both of reverse faces of an aluminum foil having a thickness of 20 μm, and dried. Next, the dried coating film was pressed to obtain a positive electrode.

<Fabrication of Negative Electrode>

$Li_4Ti_5O_{12}$ as negative electrode active material, carbon black as electro-conductive agent, and polyvinylidene fluoride as binder were prepared. For the $Li_4Ti_5O_{12}$ as negative electrode active material, a powder sample with an average primary particle size of 3 μm was prepared. These materials were mixed at a weight ratio of 90:5:5 to obtain a mixture.

Next, the obtained mixture was dispersed in n-methylpyrrolidone (NMP) solvent to prepare a slurry. The obtained slurry was applied onto both of reverse faces of an aluminum foil having a thickness of 20 μm, and dried. Next, the dried coating layer was pressed to obtain a negative electrode.

<Fabrication of Electrode Group>

Two separators made of unwoven fabric of 20 μm thickness were prepared. The positive electrode fabricated as described above, one of the separators, the negative electrode fabricated as described above, and the other separator were stacked in this order. The obtained stack was spirally wound so that the negative electrode was positioned outermost to prepare an electrode group. This was pressed to obtain a flat electrode group.

When fabricating the electrode group, the designs of the positive electrode and the negative electrode were adjusted so that the value of $(L \times M_a)/(p/n)$ was 48 mg/m. Specifically, the dimensions of the positive electrode and the negative electrode and the coating amount of the slurry were adjusted so that the total length L (L=L1+L2) of the non-facing sections of the negative electrode, the mass per unit area $M_a$ of the negative electrode active material-containing layer, and the positive-negative electrode capacity ratio p/n had the values shown in Table 1 below.

<Assembly of Battery Unit>

This flat electrode group was inserted into a flat can made of aluminum having a plate thickness of 0.3 mm as an outer container, and sealed with a lid (sealing plate). Thereby, a flat battery unit having a thickness of 5 mm, a width of 30 mm, a height of 25 mm, and a weight of 10 g was assembled. The nominal capacity of the battery was 250 mAh.

<Preparation of Nonaqueous Electrolyte>

Ethylene carbonate (EC) and ethyl methyl carbonate (EMC) were mixed at a volume ratio of 1:2 to prepare a mixed solvent. Lithium hexafluorophosphate (LiPF$_6$) was dissolved in the mixed solvent at a concentration of 1 mol/L to prepare a nonaqueous electrolyte. In addition, lithium difluorophosphate was added as an additive in an addition amount of 10,000 ppm with respect to the nonaqueous electrolyte.

<Fabrication of Battery>

The nonaqueous electrolyte was put into the outer can of the battery unit obtained as described above through an inlet provided on the surface of the outer can. Then, the inlet was subjected to temporary sealing to fabricate a temporarily sealed nonaqueous electrolyte battery. The temporarily sealed battery was adjusted to an initial-charged state with an SOC of 20% and held under a 60° C. atmosphere. Thereafter, the temporary seal was release to discharge gas generated upon the holding. Next, the inlet was resealed to obtain a nonaqueous electrolyte secondary battery.

Examples 2 to 15 and Comparative Examples 1 to 4

Batteries according to Examples 2 to 15 and Comparative Examples 1 to 4 were obtained by the same method as described in Example 1 except that various designs were changed as shown in Tables 1 and 2 below. Specifically, the dimensions of the positive electrode and the negative electrode and the coating amount of slurry were adjusted so that the total length L (L=L1+L2) of the non-facing sections of the negative electrode, the mass per unit area M$_a$ of the negative electrode active material-containing layer, and the positive-negative electrode capacity ratio p/n had the values shown in Table 1. Also, the species of the positive electrode active material, the composition and average primary particle size of the negative electrode active material, and the amount of lithium difluorophosphate or lithium monofluorophosphate added to the electrolyte were changed as shown in Table 2.

TABLE 1

|  | Total Length L of Negative Electrode Non-facing Section (mm) | Mass per Unit Area M$_a$ for Negative Electrode (g/m$^2$) | Positive-Negative Electrode Capacity Ratio p/n | [(L × M$_a$)/(p/n)] (mg/m) |
|---|---|---|---|---|
| Example 1 | 1 | 63 | 1.3 | 48 |
| Example 2 | 2.5 | 34 | 1.6 | 53 |
| Example 3 | 1 | 63 | 1.3 | 48 |
| Example 4 | 1 | 63 | 1.3 | 48 |
| Example 5 | 1 | 63 | 1.3 | 48 |
| Example 6 | 1 | 63 | 1.3 | 48 |
| Example 7 | 1 | 63 | 1.3 | 48 |
| Example 8 | 1 | 63 | 1.3 | 48 |
| Example 9 | 1 | 63 | 1.3 | 48 |
| Example 10 | 1 | 63 | 1.3 | 48 |
| Example 11 | 1 | 63 | 1.3 | 48 |
| Example 12 | 1 | 63 | 1.3 | 48 |
| Example 13 | 1 | 63 | 1.3 | 48 |
| Example 14 | 1 | 63 | 1.3 | 48 |
| Example 15 | 1 | 63 | 1.3 | 48 |
| Comparative Example 1 | 2.5 | 63 | 1.3 | 121 |
| Comparative Example 2 | 1 | 100 | 1 | 100 |
| Comparative Example 3 | 0.5 | 63 | 1.3 | 24 |
| Comparative Example 4 | 1 | 34 | 1.8 | 19 |

TABLE 2

|  | Positive Electrode Active Material | Negative Electrode Active Material | | Additive to Nonaqueous Electrolyte | |
|---|---|---|---|---|---|
|  |  | Composition | Average Primary Particle Size (μm) | Additive | Added amount (ppm) |
| Example 1 | LiNi$_{0.33}$Co$_{0.33}$Mn$_{0.33}$O$_2$ | Li$_4$Ti$_5$O$_{12}$ | 3 | lithium difluorophosphate | 10000 |
| Example 2 | LiNi$_{0.33}$Co$_{0.33}$Mn$_{0.33}$O$_2$ | Li$_4$Ti$_5$O$_{12}$ | 3 | lithium difluorophosphate | 10000 |
| Example 3 | LiNi$_{0.5}$Co$_{0.3}$Mn$_{0.2}$O$_2$ | Li$_4$Ti$_5$O$_{12}$ | 3 | lithium difluorophosphate | 10000 |
| Example 4 | LiNi$_{0.5}$Co$_{0.3}$Mn$_{0.2}$O$_2$ | Li$_4$Ti$_5$O$_{12}$ | 3 | lithium difluorophosphate | 10000 |
| Example 5 | LiNi$_{0.33}$Co$_{0.33}$Mn$_{0.33}$O$_2$ | Li$_4$Ti$_5$O$_{12}$ | 3.8 | lithium difluorophosphate | 10000 |
| Example 6 | LiNi$_{0.33}$Co$_{0.33}$Mn$_{0.33}$O$_2$ | Li$_4$Ti$_5$O$_{12}$ | 2.1 | lithium difluorophosphate | 10000 |
| Example 7 | LiNi$_{0.33}$Co$_{0.33}$Mn$_{0.33}$O$_2$ | Li$_4$Ti$_5$O$_{12}$ | 3 | lithium difluorophosphate | 1200 |

TABLE 2-continued

| | Positive Electrode Active Material | Negative Electrode Active Material | | Additive to Nonaqueous Electrolyte | |
|---|---|---|---|---|---|
| | | Composition | Average Primary Particle Size (μm) | Additive | Added amount (ppm) |
| Example 8 | $LiNi_{0.33}Co_{0.33}Mn_{0.33}O_2$ | $Li_4Ti_5O_{12}$ | 3 | lithium difluorophosphate | 25000 |
| Example 9 | $LiMn_2O_4$ | $Li_4Ti_5O_{12}$ | 3 | lithium difluorophosphate | 10000 |
| Example 10 | $LiFePO_4$ | $Li_4Ti_5O_{12}$ | 3 | lithium difluorophosphate | 10000 |
| Example 11 | $LiNi_{0.33}Co_{0.33}Mn_{0.33}O_2$ | $Li_4Ti_5O_{12}$ | 5 | lithium difluorophosphate | 10000 |
| Example 12 | $LiNi_{0.33}Co_{0.33}Mn_{0.33}O_2$ | $Li_4Ti_5O_{12}$ | 3 | lithium difluorophosphate | 900 |
| Example 13 | $LiNi_{0.33}Co_{0.33}Mn_{0.33}O_2$ | $Li_4Ti_5O_{12}$ | 3 | lithium difluorophosphate | 31000 |
| Example 14 | $LiNi_{0.33}Co_{0.33}Mn_{0.33}O_2$ | $Li_4Ti_5O_{12}$ | 3 | (no additive) | 0 |
| Example 15 | $LiNi_{0.33}Co_{0.33}Mn_{0.33}O_2$ | $Li_4Ti_5O_{12}$ | 3 | lithium monofluorophosphate | 10000 |
| Comparative Example 1 | $LiNi_{0.33}Co_{0.33}Mn_{0.33}O_2$ | $Li_4Ti_5O_{12}$ | 3 | lithium difluorophosphate | 10000 |
| Comparative Example 2 | $LiNi_{0.33}Co_{0.33}Mn_{0.33}O_2$ | $Li_4Ti_5O_{12}$ | 3 | lithium difluorophosphate | 10000 |
| Comparative Example 3 | $LiNi_{0.33}Co_{0.33}Mn_{0.33}O_2$ | $Li_4Ti_5O_{12}$ | 3 | lithium difluorophosphate | 10000 |
| Comparative Example 4 | $LiNi_{0.33}Co_{0.33}Mn_{0.33}O_2$ | $Li_4Ti_5O_{12}$ | 3 | lithium difluorophosphate | 10000 |

<Measurement of Battery Capacity>

The battery capacity of the respective batteries obtained in each of the Examples and each of the Comparative Examples was measured as follows. Each battery was charged at a constant current until the battery voltage reached 2.8 V at a current value of 20 mA under a 25° C. environment, and then charged at a constant voltage until the charge current reached 5 mA. Subsequently, each battery was discharged at 20 mA until the battery voltage reached 1.5 V. The battery capacity upon discharge was measured. As a specific example, the battery capacity confirmed using the battery produced in Example 1 was 250 mAh. Thus, the battery capacity determined by the measurement coincided with the nominal capacity.

<Cycle Performance Evaluation>

A charge-discharge cycling test at a current value of 200 mA was performed using the respective batteries obtained in each of the Examples and each of the Comparative Examples. The voltage range in the cycling test was set to 2.8 V to 1.5 V, and the ambient temperature was set to 45° C. For each nonaqueous electrolyte secondary battery, the capacity after repetition of 500 cycles of charge and discharge were examined. The value of the examined capacity after the 500 cycles relative to the nominal capacity was calculated as a capacity retention ratio ([capacity retention ratio]=100%×[capacity after 500 cycles]/[nominal capacity]). The results are shown in Table 3 below.

TABLE 3

| | Cycle Capacity Retention Ratio (%) |
|---|---|
| Example 1 | 95 |
| Example 2 | 98 |
| Example 3 | 93 |
| Example 4 | 92 |
| Example 5 | 92 |
| Example 6 | 91 |
| Example 7 | 91 |
| Example 8 | 93 |
| Example 9 | 89 |
| Example 10 | 87 |
| Example 11 | 89 |
| Example 12 | 85 |
| Example 13 | 85 |
| Example 14 | 83 |
| Example 15 | 88 |

TABLE 3-continued

| | Cycle Capacity Retention Ratio (%) |
|---|---|
| Comparative Example 1 | 76 |
| Comparative Example 2 | 77 |
| Comparative Example 3 | 77 |
| Comparative Example 4 | 78 |

In the nonaqueous electrolyte secondary batteries obtained in Examples 1 to 15, the $(L \times M_a)/(p/n)$ ratio was in the range of 40 mg/m to 60 mg/m. That is, in Examples 1 to 15, the electrode group satisfied the above-described formula (1). In the nonaqueous electrolyte secondary batteries of Examples 1 to 15, the capacity retention ratio during the cycling test was high, demonstrating that a decrease in capacity was suppressed.

Among Examples 1 to 11, the capacity retention ratio in Examples 1 to 8 was particularly high.

The reason that the decrease in capacity was further suppressed in Examples 1 to 8 as compared with Examples 9 and 10 is as follows. In Examples 1 to 8, lithium-containing nickel-cobalt-manganese composite oxides ($Li_{1-x} Ni_{1-a-b}Co_aMn_bO_2$) were used for the positive electrode active materials. In contrast, in Example 9, lithium manganese composite oxide ($LiMn_2O_4$) was used for the positive electrode active material. In Example 10, lithium iron phosphate of an olivine structure ($LiFePO_4$) was used for the positive electrode active material. Lithium-containing nickel-cobalt-manganese composite oxides have higher structural stability than the compounds used for the positive electrode active materials in Examples 9 and 10. Therefore, in Examples 1 to 8, the self-discharge phenomenon due to migration of lithium ions between the positive electrode and the negative electrode did not occur, which promoted diffusion of lithium ions to the non-facing sections of the negative electrode and immobilization of the lithium ions therein.

The reason that the decrease in capacity was further suppressed in Examples 1 to 8 as compared with Example 11 is as follows. In Example 11, the average primary particle size of the negative electrode active material particles was 5

µm. In contrast, in Examples 1 to 8, the average primary particle size of the negative electrode active material particles was even smaller. Therefore, in Examples 1 to 8, the diffusibility of lithium ions in the negative electrode was favorable, which facilitated diffusion of lithium ions to the non-facing sections and immobilization of the lithium ions therein. As a result, the shift of operation range during the cycling test was suppressed more favorably.

A comparison between Examples 12 to 14 and Examples 1 to 8 reveals that the capacity retention ratio can be further increased by appropriately adjusting the amount of difluorophosphate added to the nonaqueous electrolyte. In addition, when difluorophosphate(s) and/or monofluorophosphate(s) were/is added, the capacity retention ratio was increased as compared with the case where these additives were not added.

On the other hand, in the nonaqueous electrolyte secondary batteries obtained in Comparative Examples 1 and 2, the $(L \times M_a)/(p/n)$ ratio exceeded 60 mg/m, and the electrode group did not satisfy the above formula (1). In Comparative Examples 1 and 2, the decrease in capacity during the cycling test was large. In a state where the upper limit of formula (1) is exceeded, the relative proportion of the non-facing sections of the negative electrode is great, making it difficult to diffuse lithium ions into all of the non-facing sections. Because of this, the shift of operation range occurred during the cycling test in Comparative Examples 1 and 2, whereby the capacity could not be maintained.

In the nonaqueous electrolyte secondary batteries obtained in Comparative Examples 3 and 4, the $(L \times M_a)/(p/n)$ ratio was smaller than 40 mg/m, and thus, the electrode groups did not satisfy the formula (1). In Comparative Examples 3 and 4, the decrease in capacity during the cycling test was large. In a state falling below the lower limit of formula (1), the relative proportion of the non-facing sections of the negative electrode is little, making it difficult to immobilize lithium ions in the non-facing sections. Because of this, the shifting of operation range occurred during the cycling test in Comparative Examples 3 and 4, whereby the capacity could not be obtained.

The electrode group according to at least one embodiment and example described above includes a stack that includes a positive electrode and a negative electrode. The positive electrode includes a positive electrode current collector and a positive electrode active material-containing layer on the positive electrode current collector. The negative electrode includes a negative electrode current collector and a negative electrode active material-containing layer on the negative electrode current collector. A first width of the positive electrode active material-containing layer in a first direction is narrower than a second width of the negative electrode active material-containing layer in the first direction. The electrode group has a wound structure where the stack is wound with a center of the wound structure positioned along the first direction. A length L corresponding to a difference between the second width and the first width, a mass per unit area $M_a$ of the negative electrode active material-containing layer per each side of the negative electrode current collector, and a ratio p/n of a capacity p of the positive electrode to a capacity n of the negative electrode satisfy a relationship of 40 mg/m $\leq (L \times M_a)/(p/n) \leq$ 60 mg/m.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An electrode group comprising a stack, the stack comprising:
    a positive electrode comprising a positive electrode current collector and a positive electrode active material-containing layer on the positive electrode current collector; and
    a negative electrode comprising a negative electrode current collector and a negative electrode active material-containing layer on the negative electrode current collector,
    a first width of the positive electrode active material-containing layer in a first direction being smaller than a second width of the negative electrode active material-containing layer in the first direction,
    the electrode group having a wound structure where the stack is wound in such a manner that a center of the wound structure positioned along the first direction, and
    a length L represented in units of mm and corresponding to a difference between the second width and the first width, a mass per unit area $M_a$ of the negative electrode active material-containing layer represented in units of g/m² per each side of the negative electrode current collector, and a ratio p/n of a capacity p of the positive electrode to a capacity n of the negative electrode satisfying a relationship of 40 mg/m $\leq (L \times M_a)/(p/n) \leq$ 60 mg/m.

2. The electrode group according to claim 1, wherein the positive electrode active material-containing layer contains a lithium-containing nickel-cobalt-manganese composite oxide represented by a general formula $Li_{1-x}Ni_{1-a-b}Co_aMn_bO_2$ and satisfying $-0.2 \leq x \leq 0.5$, $0 < a \leq 0.4$, and $0 < b \leq 0.4$.

3. The electrode group according to claim 1, wherein the negative electrode active material-containing layer includes negative electrode active material particles including lithium titanate represented by $Li_{4+w}Ti_5O_{12}$ and satisfying $-0.5 \leq w \leq 3$, and having an average primary particle size of 5 µm or less.

4. A battery comprising the electrode group according to claim 1.

5. The battery according to claim 4, further comprising an electrolyte.

6. The battery according to claim 5, wherein: the electrolyte includes a difluorophosphate, a monofluorophosphate, or both the difluorophosphate and the monofluorophosphate; and a first mass concentration of the difluorophosphate, a second mass concentration of the monofluorophosphate, or a total mass concentration of the difluorophosphate and the monofluorophosphate with respect to a mass of the electrolyte is from 1000 ppm to 30000 ppm.

7. A battery pack comprising the battery according to claim 4.

* * * * *